(12) United States Patent
Levy et al.

(10) Patent No.: US 10,313,737 B2
(45) Date of Patent: Jun. 4, 2019

(54) GROUP LIVE-VIEW INTERACTIVE PROGRAM GUIDE

(71) Applicant: Guest Tek Interactive Entertainment Ltd., Calgary (CA)

(72) Inventors: Arnon Levy, Calgary (CA); Peter S. Warrick, Calgary (CA)

(73) Assignee: Guest Tek Interactive Entertainment Ltd., Calgary (CA)

( * ) Notice: Subject to any disclaimer, the term of this patent is extended or adjusted under 35 U.S.C. 154(b) by 70 days.

(21) Appl. No.: 14/980,069

(22) Filed: Dec. 28, 2015

(65) Prior Publication Data

US 2016/0198214 A1 Jul. 7, 2016

Related U.S. Application Data

(60) Provisional application No. 62/100,295, filed on Jan. 6, 2015.

(51) Int. Cl.

| | |
|---|---|
| *H04N 21/431* | (2011.01) |
| *H04N 21/482* | (2011.01) |
| *H04N 21/434* | (2011.01) |
| *H04N 21/2387* | (2011.01) |
| *H04N 21/44* | (2011.01) |

(Continued)

(52) U.S. Cl.
CPC ..... *H04N 21/4316* (2013.01); *H04N 21/2143* (2013.01); *H04N 21/2387* (2013.01); *H04N 21/4345* (2013.01); *H04N 21/44016* (2013.01); *H04N 21/4821* (2013.01); *H04N 21/6118* (2013.01); *H04N 21/6125* (2013.01); *H04N 21/64322* (2013.01)

(58) Field of Classification Search
CPC ........... H04N 21/4316; H04N 21/4821; H04N 21/4345; H04N 21/2387; H04N 21/44016; H04N 21/6125; H04N 21/64322; H04N 21/6118; H04N 21/2143
See application file for complete search history.

(56) References Cited

U.S. PATENT DOCUMENTS

| | | |
|---|---|---|
| 6,738,382 B1 | 5/2004 | West et al. |
| 6,996,073 B2 | 2/2006 | West et al. |
| | (Continued) | |

OTHER PUBLICATIONS

Rovi, "Rovi to Begin Licensing its Interactive Program Guide Intellectual Property to AT&T", Aug. 1, 2013.

*Primary Examiner* — Oschta I Montoya
(74) *Attorney, Agent, or Firm* — ATMAC Patent Services Ltd.; Andrew T. MacMillan

(57) ABSTRACT

One or more processors receive a plurality of original video streams, generate a guide video stream that includes each of the original video streams resized and arranged such that all of the original video streams are simultaneously visible and playing on the guide video stream, and display the guide video stream on a display device. The one or more processors further provide an interactive user interface on the display device in conjunction with the guide video stream to thereby allow a user of the set-top box to select one of the original video streams shown playing on the guide video stream for full screen playback. In response to the user selecting a particular original video stream for full screen playback, the one or more processors play full screen on the display device the particular original video stream as selected by the user.

20 Claims, 16 Drawing Sheets

(51) Int. Cl.
    *H04N 21/61*     (2011.01)
    *H04N 21/643*     (2011.01)
    *H04N 21/214*     (2011.01)

(56) References Cited

U.S. PATENT DOCUMENTS

| | | |
|---|---|---|
| 7,580,376 B2 | 8/2009 | West et al. |
| 8,434,111 B2 | 4/2013 | Levy et al. |
| 8,578,418 B2 | 11/2013 | Levy et al. |
| 8,713,612 B2 | 4/2014 | Levy et al. |
| 8,732,749 B2 | 5/2014 | Hulse et al. |
| 8,752,092 B2 * | 6/2014 | Weeks ............... H04N 7/17318 725/41 |
| 8,854,195 B2 | 10/2014 | West et al. |
| 9,003,455 B2 | 4/2015 | Hulse et al. |
| 9,025,599 B2 | 5/2015 | Smith et al. |
| 9,038,112 B2 | 5/2015 | Warrick et al. |
| 9,229,734 B2 | 1/2016 | Hulse et al. |
| 9,301,001 B2 | 3/2016 | Warrick et al. |
| 9,503,419 B2 | 11/2016 | Smith et al. |
| 9,596,509 B2 | 3/2017 | Warrick et al. |
| 9,705,846 B2 | 7/2017 | Smith et al. |
| 9,918,130 B2 | 3/2018 | Warrick et al. |
| 2010/0312826 A1 * | 12/2010 | Sarosi ................. H04L 65/605 709/203 |
| 2011/0314502 A1 * | 12/2011 | Levy ..................... H04N 7/106 725/46 |
| 2014/0250460 A1 | 9/2014 | Hulse et al. |
| 2015/0052572 A1 * | 2/2015 | Schemmann ....... H04L 12/2801 725/116 |
| 2015/0264427 A1 | 9/2015 | Hulse et al. |
| 2015/0312618 A1 * | 10/2015 | McElhatten ....... H04N 5/44543 725/53 |
| 2016/0014450 A1 | 1/2016 | Hulse et al. |

\* cited by examiner

GROUP LIVE-VIEW INTERACTIVE PROGRAM GUIDE

CROSS-REFERENCE TO RELATED APPLICATIONS

This application claims the benefit of U.S. Provisional Application No. 62/100,295 filed Jan. 6, 2015, which is incorporated herein by reference.

BACKGROUND OF THE INVENTION (1) Field of the Invention

The invention pertains generally to interactive program guides (IPGs) and electronic program guides (EPGs) for television and other media content. More specifically, the invention relates to a media system that provides a program guide allowing users to quickly see what is playing on a plurality of television channels.

(2) Description of the Related Art

Electronic program guides (EPGs) and interactive program guides (IPGs) are menus that are shown on a television (TV) or other display device listing currently playing and upcoming content available on various TV channels. An EPG is usually non-interactive such as a continuously scrolling menu whereas an IPG is interactive so that a user can move a cursor around the menu in order to highlight programs and channels, get more information, and make a selection of desired content.

One problem with currently available EPGs and IPGs is that it is difficult for a user unfamiliar with the channel line up to find desired content to watch. For example, a foreign guest of a hotel may be completely unfamiliar with any of the channel brands and names of the channels that are available in the hotel. The guest must therefore take considerable time initially to read the IPG and find desired content.

An example of this problem is as follows. A business traveler based out of North America is staying at a hotel in Beijing and wishes to watch live a golf competition occurring in the United States. In another example, a Chinese business traveler is staying at a hotel in Toronto and wishes to watch a soccer match taking place in Central America. In both these situations, the guest may desire to watch a well-known and famous sporting event, but due to being in an unfamiliar television landscape (e.g., a hotel in a foreign country), the guest may have trouble finding the desired channel that is covering the event. For one, the guest may not understand the language utilized on the EPG/IPG at the hotel. Furthermore, even if the language of the EPG/IPG is understood by the guest, a new guest at a hotel will most likely not know the channel line-up offered by the hotel and may not recognize the names of the channels or be able to quickly ascertain the types of content that are playing on the various available channels. Trying to find a famous sporting event may be difficult and/or time consuming in these circumstances. Trying to find a lesser known program such as a specific news program or talk show may be even more troublesome.

BRIEF SUMMARY OF THE INVENTION

According to an exemplary embodiment of the invention, disclosed is a media system including a computer server having a first processor, first memory, and first communication interface; and a set-top box having a second processor, second memory, and second communication interface. By the first processor executing first software loaded from the first memory, the computer server is configured to receive a plurality of original video streams via the first communication interface, generate a guide video stream that includes each of the original video streams resized and arranged such that all of the original video streams are simultaneously visible and playing on the guide video stream, and transmit the guide video stream to the set-top box. By the second processor executing second software loaded from the second memory, the set-top box is configured to receive the guide video stream from the computer server, display the guide video stream on a display device, provide an interactive user interface on the display device in conjunction with the guide video stream to thereby allow a user of the set-top box to select one of the original video streams shown playing on the guide video stream for full screen playback, and in response to the user selecting a particular original video stream for full screen playback, play full screen on the display device the particular original video stream as received via the second communication interface.

According to another exemplary embodiment of the invention, disclosed is a set-top box comprising a processor; memory coupled to the processor and storing software for execution by the processor; and a communication interface coupled to the processor. By the processor executing the software loaded from the memory, the processor is configured to receive a plurality of original video streams via the communication interface; generate a guide video stream that includes each of the original video streams resized and arranged such that all of the original video streams are simultaneously visible and playing on the guide video stream; display the guide video stream on a display device; provide an interactive user interface on the display device in conjunction with the guide video stream to thereby allow a user of the set-top box to select one of the original video streams shown playing on the guide video stream for full screen playback; and in response to the user selecting a particular original video stream for full screen playback, play full screen on the display device the particular original video stream as received via the communication interface.

According to yet another exemplary embodiment of the invention, disclosed is a method of providing media in a media system. The method includes receiving via a network a plurality of original video streams at a computer server; generating, by the compute server, a guide video stream that includes each of the original video streams resized and arranged such that all of the original video streams are simultaneously visible and playing on the guide video stream; and transmitting the guide video stream from the computer server to a set-top box. The method further includes displaying the guide video stream on a display device by the set-top box; providing, by the set-top box, an interactive user interface on the display device in conjunction with the guide video stream to thereby allow a user of the set-top box to select one of the original video streams shown playing on the guide video stream for full screen playback, and in response to the user selecting a particular original video stream for full screen playback, playing full screen on the display device the particular original video stream as received via the network by the set-top box.

According to yet another exemplary embodiment of the invention, disclosed is a method of providing media in a media system. The method includes receiving a plurality of original video streams; generating a guide video stream that includes each of the original video streams resized and arranged such that all of the original video streams are simultaneously visible and playing on the guide video stream; and displaying the guide video stream on a display device. The method further includes providing an interactive user interface on the display device in conjunction with the guide video stream to thereby allow a user to select one of the original video streams shown playing on the guide video stream for full screen playback; and in response to the user selecting a particular original video stream for full screen playback, playing full screen on the display device the particular original video stream as received via a communication interface.

These and other advantages of the present invention will no doubt become apparent to those of ordinary skill in the art after reading the following detailed description and reviewing the preferred embodiments illustrated in the various figures and drawings.

BRIEF DESCRIPTION OF THE DRAWINGS

The invention will be described in greater detail with reference to the accompanying drawings which represent preferred embodiments thereof.

DETAILED DESCRIPTION

Figure 1:
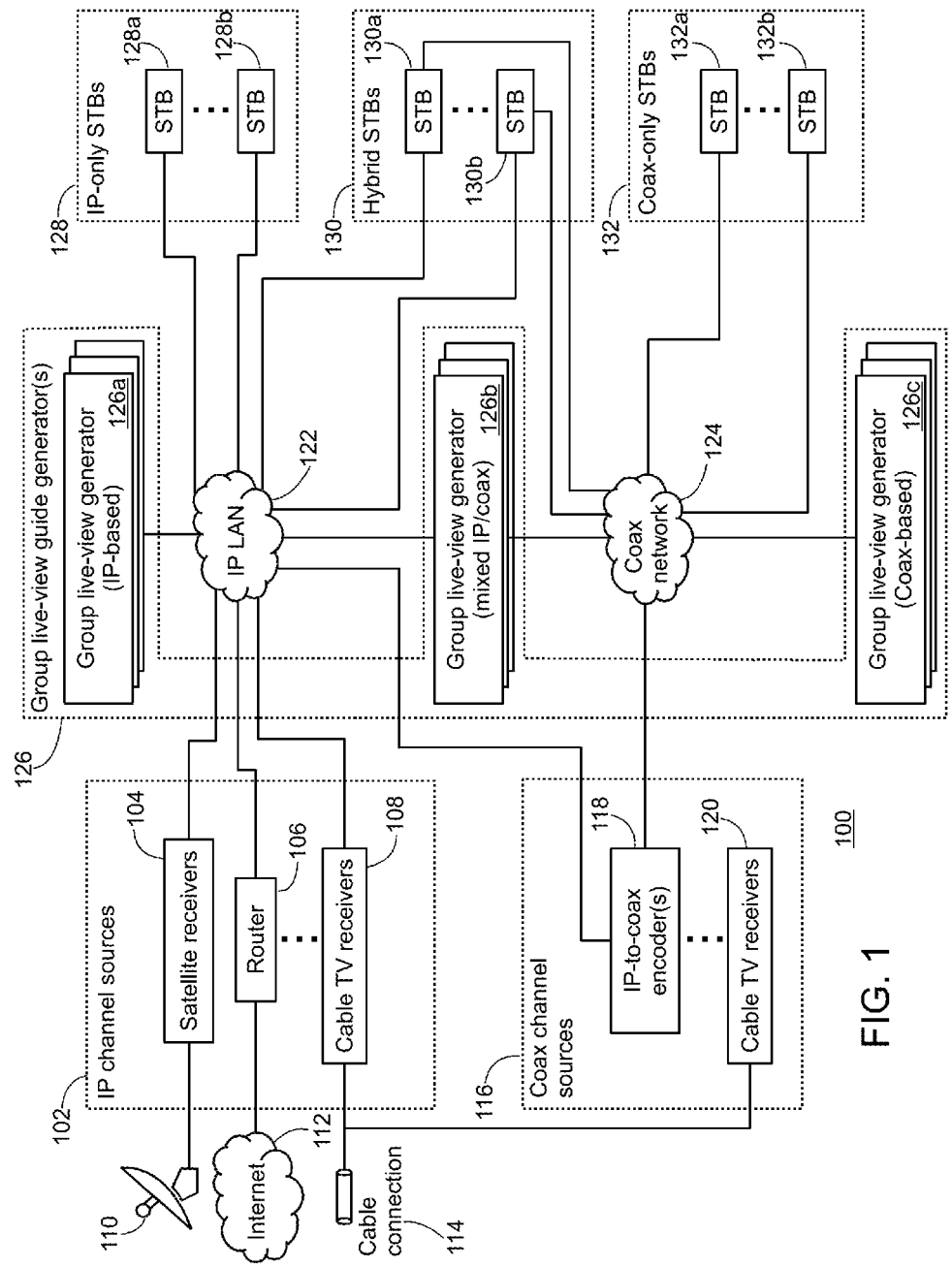
FIG. 1 illustrates a media system providing a group live-view interactive channel guide (IPG) according to an exemplary embodiment of the invention.

FIG. 1 illustrates a media system 100 providing a group live-view interactive channel guide (IPG) according to an exemplary embodiment of the invention. The system 100 includes a plurality of Internet Protocol (IP) sources 102 including satellite receivers 104, router 106, and cable television (TV) receivers 108. The satellite receivers 104 receive and decode signals from one or more antennas 110, the router 106 routes packets to/from the Internet 112 and further acts as a gateway and firewall, and the cable TV receivers 108 receive digital and/or analog television programming signals from a cable connection 114.

The system 100 further includes a plurality of coax channel sources 116 including one or more IP-to-coax encoders 118 and coax-based cable TV receivers 120.

The various IP channel sources 102 deliver IP-based data packets to an IP-based local area network (LAN) 122, which, for example, may utilize the well-known Ethernet protocol. At the same time, the various coax channel sources 116 deliver television channel programming using quadrature amplitude modulation (QAM) signals over a coax network 124.

The system 100 further includes one or more group live-view guide generator(s) 126, of which three different types are shown in FIG. 1 including IP-based group live-view generators 126a, mixed IP/coax based group live-view generators 126b, and coax-based group live-view generators 126c. As will be described further in the following, each type of group live-view guide generator 126 may include a plurality of similar guide generators 126 for a respective plurality of different themes of content.

Continuing the description of FIG. 1, the system 100 further includes a plurality of set-top boxes (STBs) including IP-only STBs 128, hybrid IP/coax STBs 130, and coax-only STBs 132. In the illustrated example, two IP-only STBs 128a, 128b are coupled to the IP LAN 122 and receive television programming and media content via IP LAN 122. Similarly, two hybrid STBs 130a, 130b are coupled to both the IP LAN 122 and the coax network 124 and receive some television programming and media content from each of these two different networks 122, 124. Finally, two coax-only STBs 132a, 132b are coupled to just the coax network 124 and receive television programming and media content via only the coax network 124.

In an application-specific embodiment, the system 100 is installed at a hospitality establishment such as a hotel or resort. Taking a hotel as an example, the IP LAN 122 and coax network 124 are installed within the hotel and are coupled to the plurality of STBs 128, 130, 132, which are located throughout the various guest rooms of the hotel. The group live-view guide generators 126 are implemented by one or more computer servers 200 (see FIG. 2) located in a server room along with other telecommunication headend equipment at the hotel. For example, the various IP channel sources 102, coax channel sources 116, and group live-view guide generators 126 may be rack-mounted electronic equipment positioned in a basement room or other private area of the hotel locked away and safe from tampering by guests.

Figure 2:
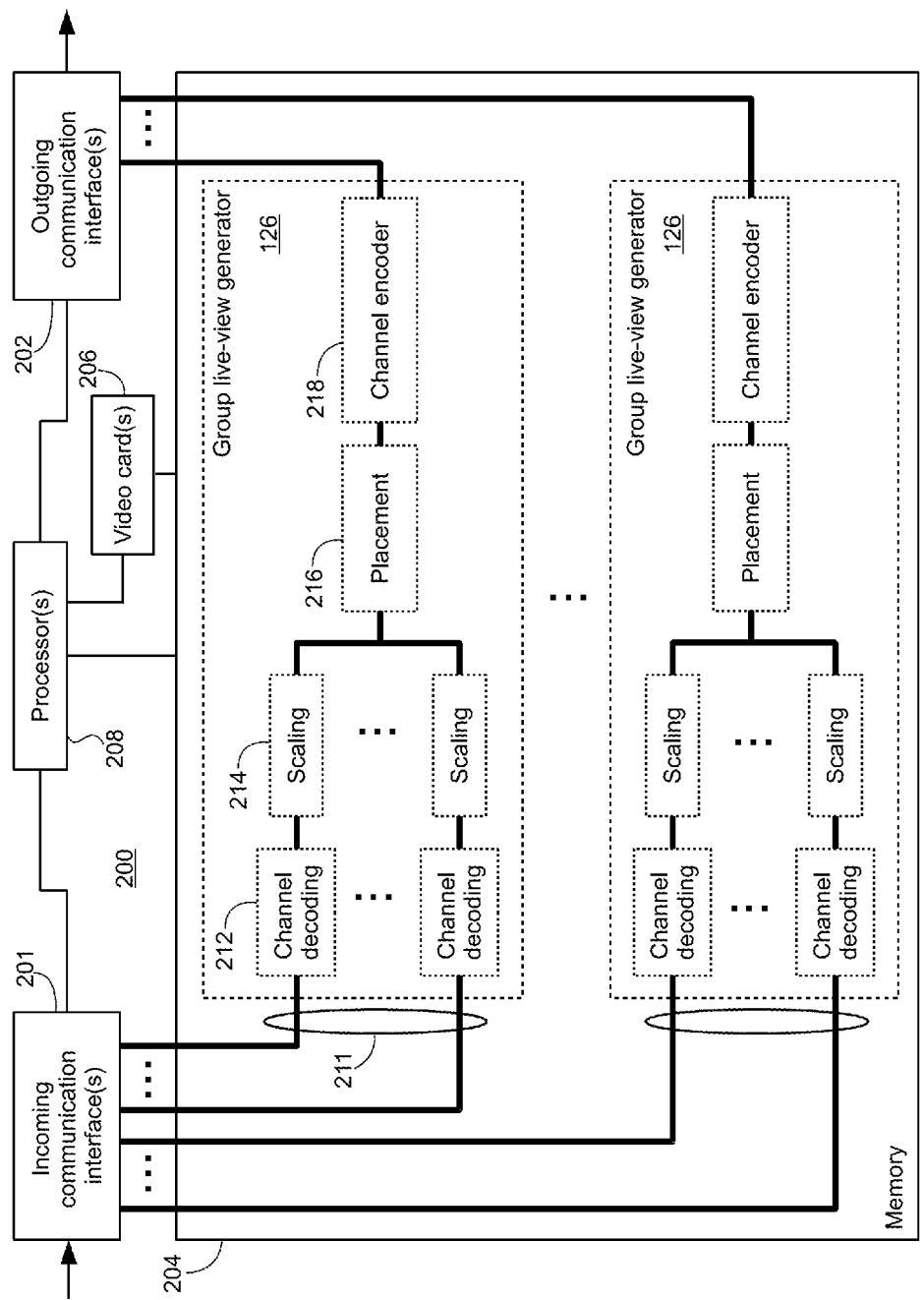
FIG. 2 is block diagram of a computer server implementing one or more of the group live-view IPG generators of FIG. 1.

FIG. 2 is block diagram of a computer server 200 implementing one or more of the group live-view guide generators 126 of FIG. 1. The computer server includes one or more incoming and outgoing communication interfaces 201, 202. Although the interfaces 201, 202 are shown separately in FIG. 2, it is also possible that these two interfaces 201, 202 represent a single interface that is utilized for both incoming and outgoing communications. Examples of incoming and outgoing communications interfaces 201,202 include Ethernet network cards and radio frequency (RF) QAM tuner cards. Other types of communication cards may be included in a similar manner.

The computer 200 also includes memory 204, which may be a combination of random access memory (RAM) modules and non-volatile magnetic storage such as one or more hard disk drives and/or FLASH memory. Other types of memory may also be included as desired. The computer 200 includes one or more video cards 206, and each of the incoming/outgoing communication interfaces 201, 202, memory 204, and video cards 206 are coupled to one or more general purpose computing processors 208. The singular form of the word "processor" will be utilized in the following description but it is to be understood that a plurality of processors may also work together to perform the operations described in this document as being performed by the processor 208. For example, it is well-known that computer servers typically include a plurality of processors (sometimes also referred to a cores).

As shown in FIG. 2, the memory 204 includes a number of software modules containing instructions that are executed by the processor 208 in order to perform the functions of the group live-view guide generators 126 shown in FIG. 1. In this example, the computer 200 has a sufficient resources to implement a plurality of the group live-view guide generators 126. Depending on the specific types of incoming/outgoing communication interfaces 201, 202 installed in the computer server 200, the computer server may be made to implement IP-based group live-view generators 126a, mixed IP/coax group live-view generators 126b, and/or coax-based group live-view generators 126c. In fact, a single computer server 200 may be utilized to implement all of the group live-view guide generators 126 required for the system 100, or a plurality of computer servers 200 may be utilized to implement different ones of the group live-view guide generators 126 for system 100.

One reason to utilize multiple computer servers 200 would be to reduce the performance requirements such as a processor 208 speed, power supply, numbers of video cards 206, amount of memory 204 etc. required for each computer server 200 and thereby lower the cost of the computer server 200 while still providing a large number of different group live-view generators 126 in the system 100. Other reasons include to provide redundancy and to enable up and down scaling capabilities by dynamically and automatically adding or removing (e.g., instantiating/deinstantiating) computer servers 200 as required by the number of group live-view guide generators 126 desired at any particular moment in time.

The group live-view guide generators 126 illustrated in FIG. 2 are implemented by a number of software modules including a channel decoding module 212, a scaling module 214, a placement module 216, and a channel encoder module 218. In this embodiment, the illustrated modules 212, 214, 216, 218 are software modules that are executed by either the central processor(s) 208 of the computer server 200 and/or by one or more processor(s) (not shown) included on the one or more video cards 206. For instance, it may be beneficial to offload as much processing as possible to the video cards 206 (which are specifically optimized for video processing) to thereby free up the central processor 208 for other tasks for which the computer server 200 is responsible. In other embodiments, the modules 212, 214, 216, 218 may instead be dedicated hardware modules such as implemented by one or more application specific integrated circuits (ASICs) custom designed to perform one or more of the below-described functions. Any combination of software and hardware to implement to the modules 212, 214, 216, 218 may be employed. As will be explained later with reference to FIG. 16, it is also possible to move these modules 212, 214, 216, 218 to the client side within set-top boxes rather than being provided at a central computer server 200.

Regardless of the location of the modules 212, 214, 216, 218, in this embodiment each group live-view generator 126 operates as follows. A plurality of channel decoding modules 212 in a single group live-view guide generator 126 receive and decode each of a group of separate incoming original video streams 211 such as different television channels. For example, the original video streams 211 received by a particular group live-view guide generator 126 may each be a different sports-related television channel. Although incoming television channels are used as examples of the original video streams 211 going forward in this description, any incoming video streams can be received by the channel decoding modules 212 in a similar manner and it is not a limitation that the original video streams 211 must be television channels.

The scaling modules 214 of the group live-view generator 126 then scale down the incoming television channels 211 so that they do not fill the entire screen. For example, assuming the live-view generator is to generate a group live-view guide channel stream at a typical high definition (HD) channel resolution of 1920×1080 pixels, the scaling modules 214 may scale down each of the incoming television channels 211 to a resolution of 400×225 pixels, which would be sufficient to arrange four of the scaled down versions of the incoming television channels 211 side by side within an available horizontal space of 1920 pixels on the generated group live-view guide stream 10 (see FIG. 3) while still leaving some room in between for UI elements and background.

The placement module 216 of the group live-view generator 126 then arranges the resized versions of the incoming television channels 211 outputted by the various scaling modules 214 and places them onto a live-view guide background. For example, assuming there are a total of eight incoming television channels 211, each scaled down to a resolution of 400×225 pixels, four of the scaled down versions may be arranged by the placement module 216 in two rows across the bottom of the generated guide channel stream. The live-view guide background may be a single color or pattern or transparency, or may be an image more relevant to the theme of the guide channel such as a sports related image in this example.

The channel encoder 218 then encodes the output of the placement module 216 and thereby forms the group live-view guide video stream 10 (see FIG. 3) ready for transmission to the STBs 128, 130, 132 in the hotel.

Figure 3:
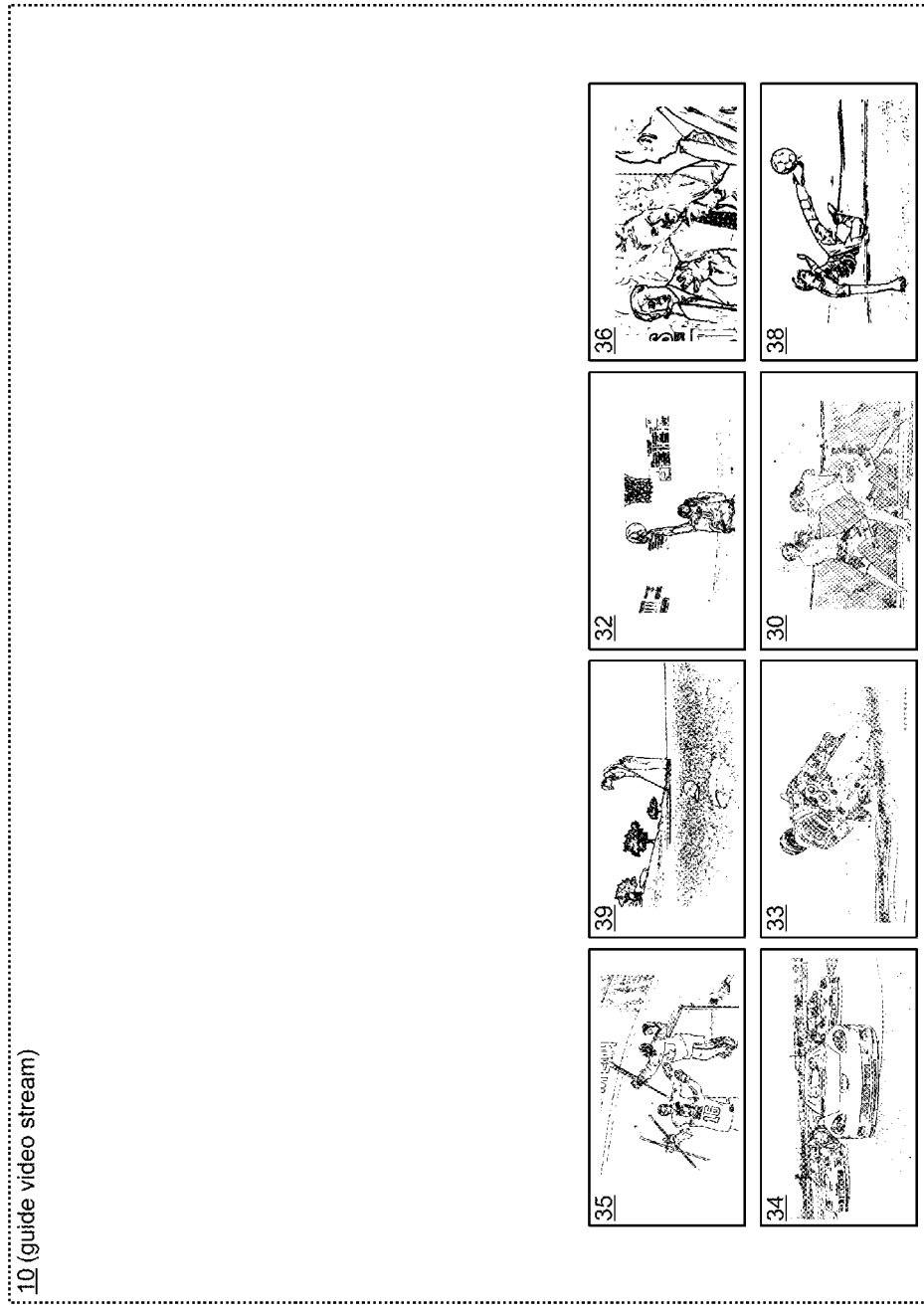
FIG. 3 illustrates an example of a group live-view guide channel video stream as generated by a group live-view generator of FIG. 2.

FIG. 3 illustrates an example of a group live-view guide video stream 10 as generated by a group live-view generator 126. In this example, the guide video stream 10 is transmitted as the television channel No. 10 throughout the hotel for display by the STBs 128, 130, 132. The layout in this example includes two rows of four channels, i.e., channels 35, 39, 32, 36, 34, 33, 30, and 38 in this example. The included television channels 35, 39, 32, 36, 34, 33, 30, 38 are scaled down on the group live-view guide channel 10 and correspond to the incoming original video streams 211 inputted into the group live-view guide generator 126 shown in FIG. 2. The background of the group live-view channel stream 10 is a solid white background in this example, and the group live-view channel stream 10 is streamed from the computer server 200 to the STBs 128, 130, 132 in the hotel via one or both of the LAN 122 and/or coax network 124.

As shown in FIG. 3, the incoming television channels 211 are resized and arranged such that all eight of the incoming channels 211 are simultaneously visible and playing on the group live-view guide channel 10 streamed as video by the channel encoder 218. The processor 208 of the computer server 200 transmits this guide video stream 10 outputted by the channel encoder 218 to one or more of the STBs 128, 130, 132 via the outgoing communication interface(s) 202. The guide video stream 10 may be transmitted via any suitable mechanism, for example, via the IP LAN 122 and/or the coax network 124.

Although only a single group live-view generator 126 has been described with respect to FIG. 2, as previously mentioned it is to be understood that the computer server 200 may provide multiple different group live-view guide video streams 10 streamed on one or more of the IP LAN 122 and/or coax network 124 in a similar manner. In one exemplary embodiment, multiple group live-view guide channels are generated and each different group live-view guide channel pertains to a particular theme of content. For example, a dedicated live-view guide channel may be generated and streamed for sports related content, news related content, movies related content, documentaries, situation comedies, features channels, and even hotel-specific channels such as advertisements of services available within, nearby, or in conjunction with the hotel. In a specific embodiment, a plurality of nine different group live-view guide channel streams 10, each showing eight playing channels, may be generated by a respective plurality of nine group live-view guide generators 126 to thereby cover a total of seventy-two of the available channels at a hotel. In yet another embodiment, the specific plurality of incoming video streams 211 for a particular group live-view generator 126 may be changed at any time to include different channels and/or orders of channels in response to any particular event occurrences. For example, a particular guide channel 10 may be customized for the user currently checked in to the hotel room in which the particular guide channel 10 is going to be transmitted.

Figure 4:
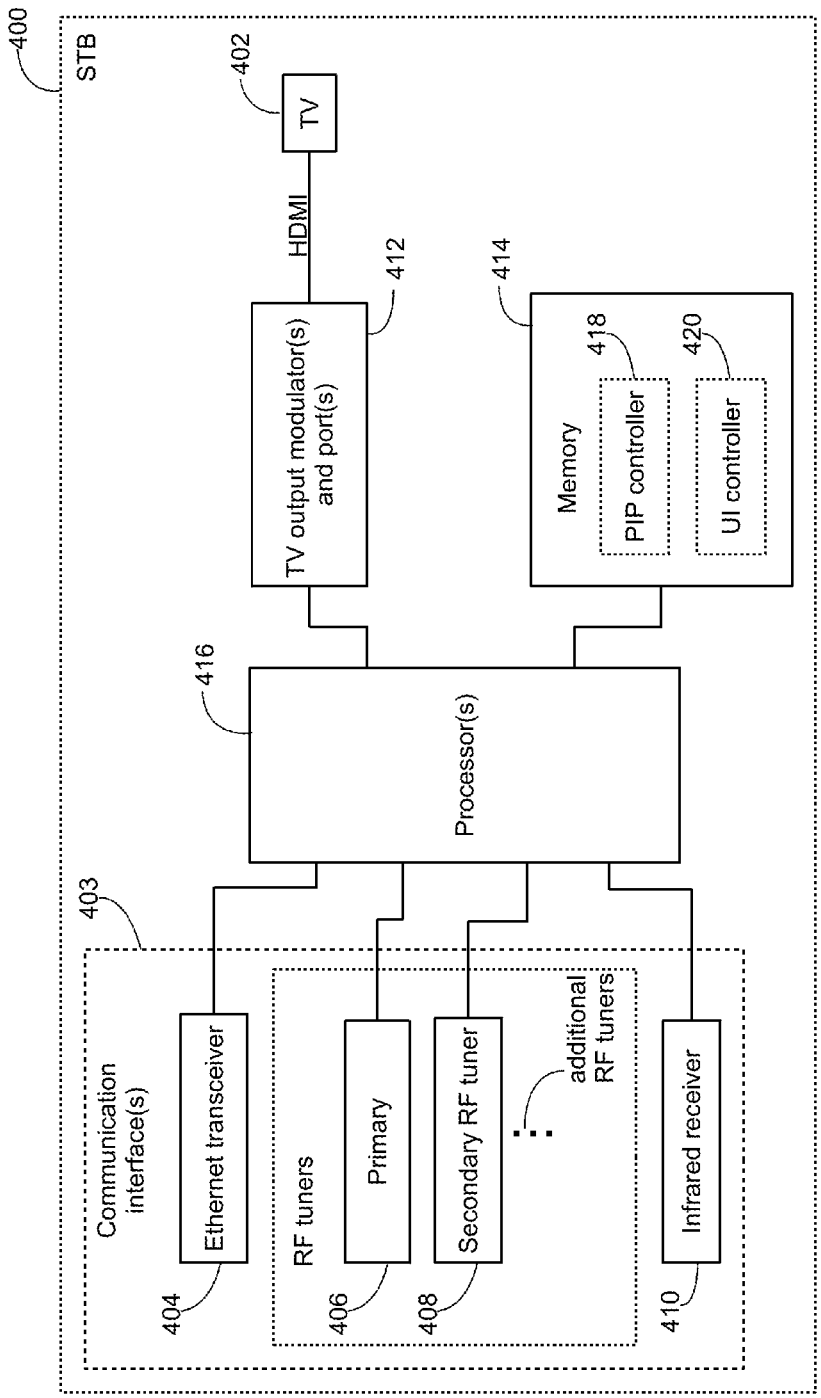
FIG. 4 is a block diagram of a set-top box (STB) for receiving and providing a user interface (UI) in conjunction with the group live-view guide channel stream generated by the computer server of FIG. 2.

FIG. 4 is a block diagram of a set-top box (STB) 400 for receiving and providing a user interface (UI) in conjunction with the group live-view guide channel stream 10 received from the computer server 200 of FIG. 2. The STB 400 displays a particular group live-view guide channel stream 10 on an attached display device such as a television (TV) 402 and then provides a UI in conjunction with the guide channel video stream 10 in order to allow a user to select any of the channels previewed thereon for full screen viewing.

In this embodiment, the STB 400 is a separate physical device external to the TV 402 and the two are connected by a cable such as an HDMI cable. However, in another embodiment, the STB 400 may be integrated within the display device such as within a smart TV that does not need an external box providing the set-top functionality.

The STB 400 includes one or more communication interfaces 403 including, in this embodiment, an Ethernet transceiver 404 for coupling to the LAN 122, a number of RF tuners such as a primary and secondary RF tuner 406, 408 for coupling to the coax network 124, and an infrared receiver 410 for receiving infrared signals from a remote control device (not shown) operated by a user of the STB 400 when interacting with the UI provided by the STB 400.

The STB 400 further includes one or more TV output modulator(s) and output port(s) 412, which allow the STB 400 to be coupled and provide video signals to the TV 402. For instance, the TV output circuit 412 in FIG. 3 is implemented by an HDMI driver chip component. In other embodiments, multiple TV output modulators and ports 412 may be included such as component video output (Y, Pb/Cb Pr/Cr), composite video output, stereo digital and analog audio output, S-Video, VGA, etc. In yet other embodiments, the STB 400 is integrated within the display device 402 and the output modulators and ports 412 are internal to the integrated STB/TV device. As these various video output protocols and their associated hardware drivers are well-known in the art, further description is omitted herein for brevity.

The STB 400 further includes a memory 414, and the memory 414, various communications interfaces 403, and TV output modulator(s) and port(s) circuitry 412 are coupled to one or more processor(s) 416. Again, although the singular form of the word "processor" will be used going forward in this description, it is to be understood that a plurality of processors (also sometimes referred to as cores) may be utilized to perform the below-described operations of processor 416.

In this embodiment, the processor 416 executes software modules 418, 420 stored in the memory 414. Examples of software modules include a picture-in-picture (PIP) module 418 and a user interface (UI) controller 420. Briefly described, the PIP module 418 causes the processor 416 to position a scaled down version of a television channel received via one of the Ethernet transceiver 404, primary RF tuner 406, or secondary RF tuner 408 over the top of another television channel received via one of the Ethernet transceiver 404, primary RF tuner 406, or secondary RF tuner 408. A purpose of this functionality in some embodiments is for the PIP controller 418 to be used to display a larger version of a selected one of the channels shown on the group live-view guide channel stream 10 superimposed on top of the group live-view guide channel stream 10. The UI controller 420 causes the processor 416 to generate and display a user interface (UI) superimposed on top of the group live-view guide channel 10 to help a user of the STB 400 interact with and select one of the channels 35, 39, 32, 36, 34, 33, 30, 38 shown on the group live-view guide channel 10.

Figure 5:
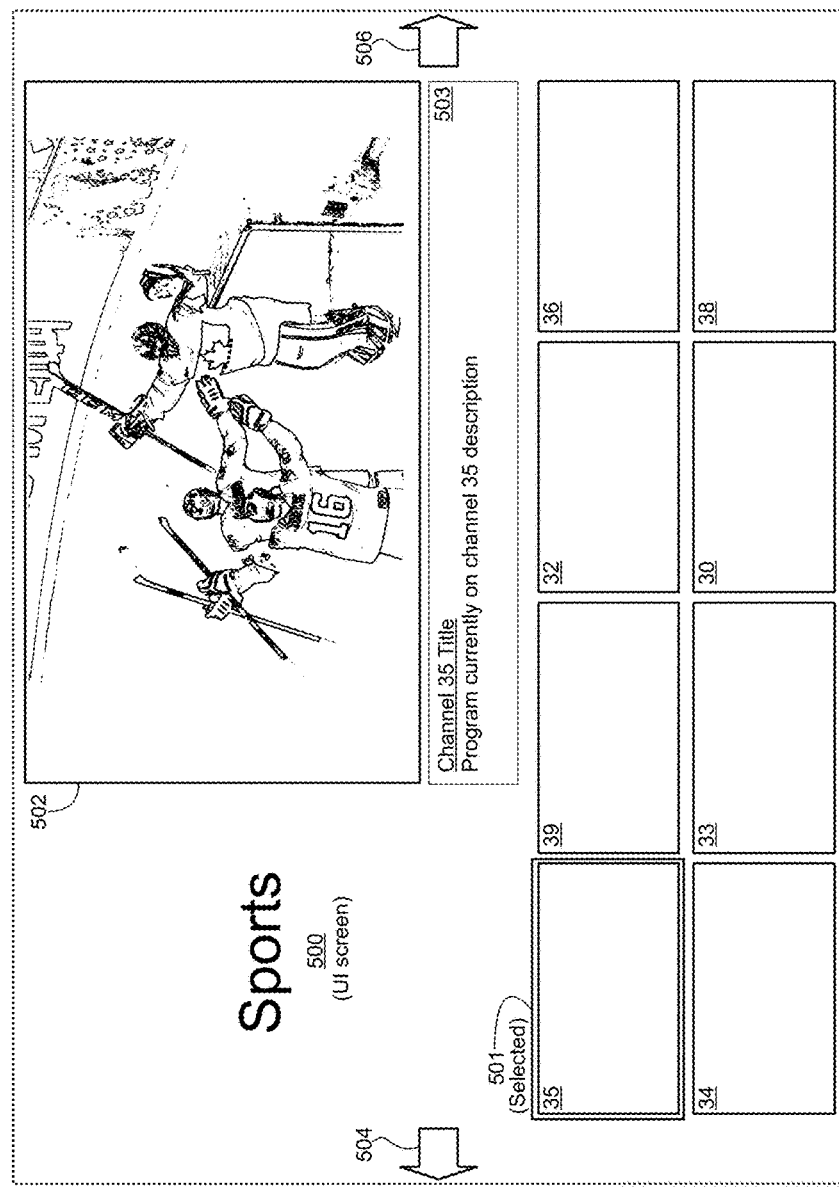
FIG. 5 illustrates a user interface (UI) screen with picture-in-picture (PIP) preview as generated by the STB of FIG. 4 according to an exemplary embodiment of the invention.

FIG. 5 illustrates a user interface (UI) screen 500 with picture-in-picture (PIP) preview 502 as generated by the STB 500 according to an exemplary embodiment of the invention. As illustrated, the UI screen 500 includes a number of elements provided by the PIP controller 418 and UI controller 420 running on the STB 400. One thing the UI controller 410 does is to draw a selection box 501 around the channel that is currently selected by the user. For instance, by default, the selection box 501 is shown by the UI controller 410 around the first channel position, i.e., channel 35 in this example. Since channel 35 is currently selected, the UI controller 420 further operates the PIP controller 418 to receive the real television channel 35 via one of the communication interfaces of the STB such as the secondary RF tuner 408 and to display a larger version of channel 35 in the preview area 502 of the UI screen 500. The PIP controller 418 further plays the audio from the selected channel, i.e., channel 35 selected at the time illustrated in FIG. 5, as received via the secondary RF tuner 308. In this way, the user can both see a larger version of the selected channel in preview area 502 and hear the audio of that channel as previewed in the preview area 502.

The UI controller 420 further provides a program information box 503 providing metadata details of the selected channel such as the channel title and current program description, and one or more guide channel change arrows 504, 506 allowing the user to move to different group live-view guide channels 10. Other UI elements may be included as desired such as a hotel or other brand logos, the title theme of the group live-view guide channel 10 (i.e., "Sports", "Movies", "News", . . . ), language selection buttons to allow the user to change the language of the textual content etc. The background of the UI screen 500 in this example is transparent so that it may be overlaid over the group live-view guide channel 10 and the eight channels playing the group live-view guide channel 10 will be visible to the user underneath the UI screen 500.

In this embodiment, the UI screen 500 is interactive in that a user can move the selection box 501 to other channels and when this happens the PIP preview 502 is automatically updated by the STB 400 to show the larger preview of the newly selected channel. In addition to the PIP preview 502 being a larger version of the content playing within the selection box 501 as provided by the group live-view guide channel 10, in this embodiment the PIP preview 502 also involves the STB 400 playing the audio from the selected channel. As the user selects other channels on the UI screen 500, the PIP preview 502 is automatically updated to play an expanded-size video version of the selected channel along with its audio.

Figure 6:
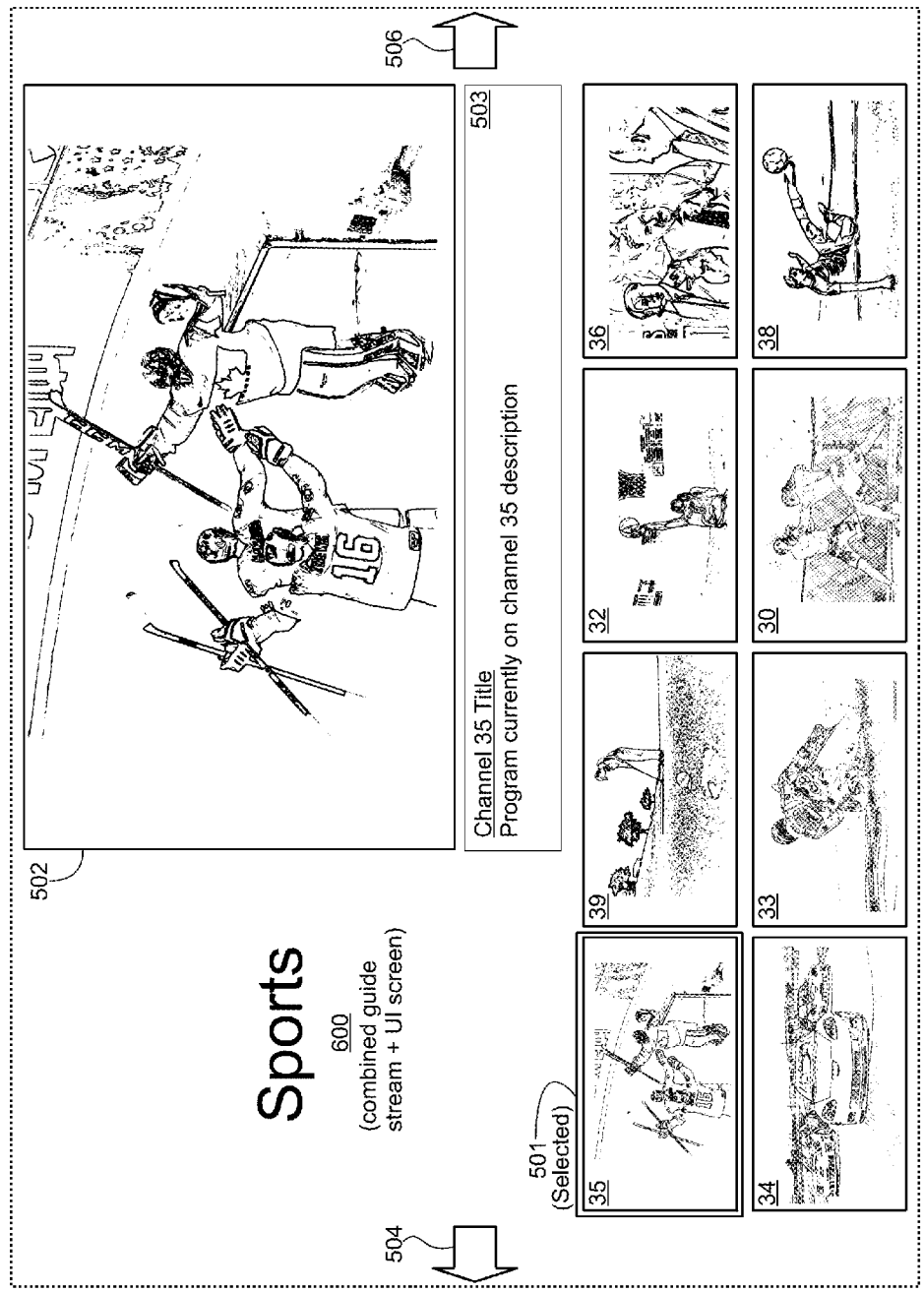
FIG. 6 shows a combined view of the UI screen of FIG. 4 superimposed over the group live-view guide channel stream of FIG. 3 as seen by the user of the STB while a first channel is selected.

FIG. 6 shows a combined view 600 of the UI screen 500 superimposed over the group live-view guide channel stream 10 as is seen by the user of the STB 400 during a time when channel 35 is selected. The STB 400 firstly receives and displays the group live-view guide channel 10 on the TV 402. Then, the UI screen 500 provided by the STB is superimposed over the group live-view guide channel 10 on the TV 402. The processors 416 receive and play the selected channel 35 in the PIP preview 502 so the user can see a larger view of channel 35 (currently selected) and can also hear the audio portion of the selected channel playing on the speakers of the TV 402. The program information box 503 includes details of the selected channel 35 obtained from metadata available to the STB 400. At the time that the combined view 600 is being displayed on the TV 402, a first of the communication interfaces 404 such as the primary tuner 406 is utilized to receive the group live-view guide channel 10 and another of the communication interfaces 404 such as the secondary RF tuner 408 is utilized to receive the selected channel 35. Further, the user can also see what is playing on each of the channels 35, 39, 32, 36, 34, 33, 30, 38 as playing on the group live-view guide channel stream 10 also visible on view 600, and the user can use the arrow keys on the infrared remote control of the STB 400 to move the selection box 501 to select any of the other channels 39, 32, 36, 34, 33, 30, 38 shown. For example, it may be the case that the user desires to watch another of the channels because the user sees that a golf game the user is interested in is currently being covered on channel 39.

Figure 7:
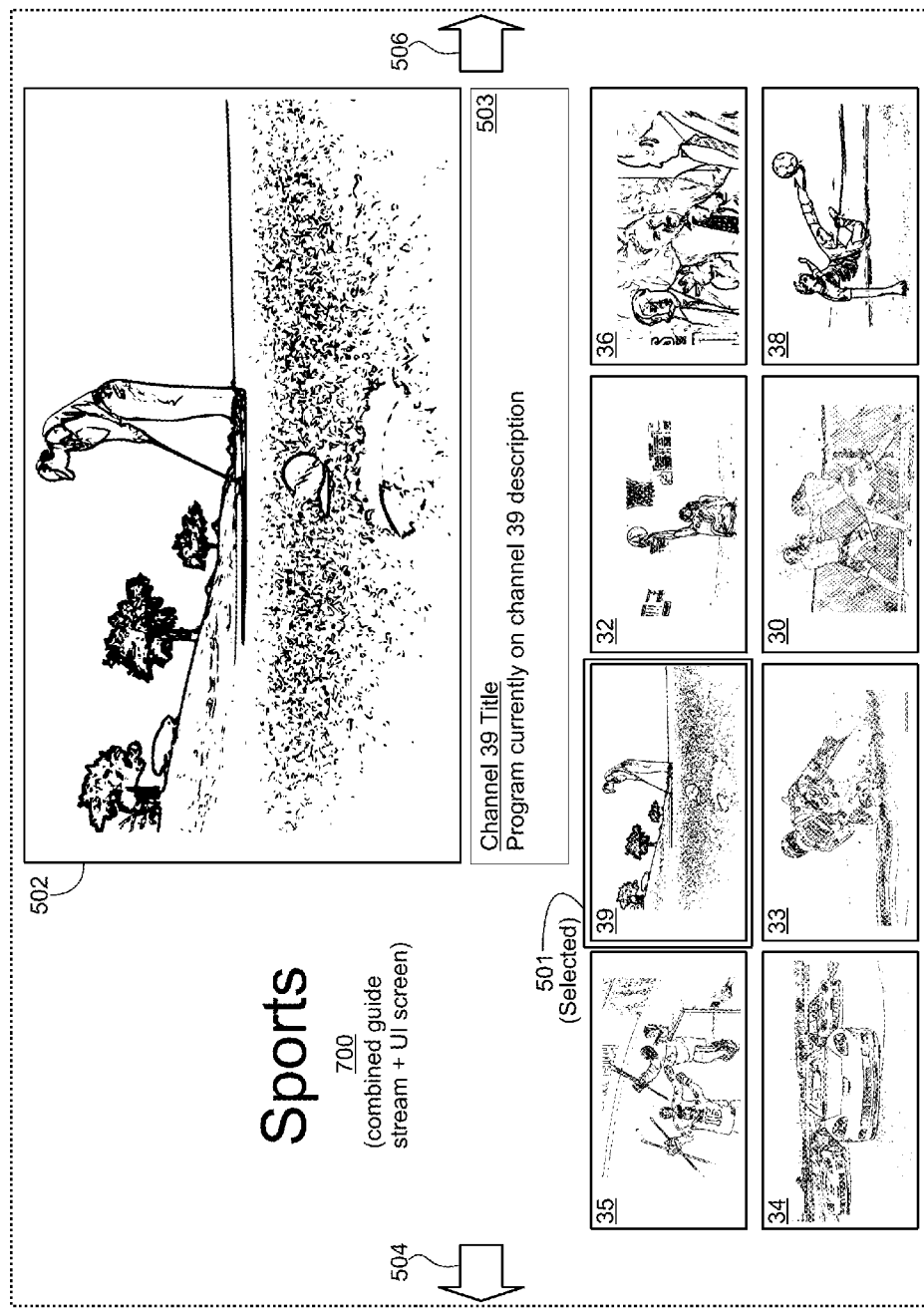
FIG. 7 shows a second combined view of the UI screen of FIG. 4 superimposed over the group live-view guide channel stream of FIG. 3 as seen by the user of the STB after a second channel is selected.

FIG. 7 shows a second combined view 700 of the UI screen 500 superimposed over the group live-view guide channel stream 10 as seen by the user of the STB 400 after channel 39 is selected. For example, the user may select channel 39 by pressing the right arrow key on the infrared remote control. After the user has selected channel 39, the processor 416 of the STB 400 makes a number of changes. In particular, the selection box 501 is moved to indicate channel 39 is selected, the program information box 503 is updated with the metadata for the newly selected channel 39, the PIP preview 502 is changed so that the real channel 39 is received and displayed for a larger video preview, and the audio for channel 39 received when receiving the real channel 39 for the PIP preview 502 is played on the speakers. As before, the user can continue to see what is playing on each of the channels 35, 39, 32, 36, 34, 33, 30, 38, and the user can use the arrow keys on the infrared remote control of the STB 400 to move the selection box 501 to select any of the other channels 35, 32, 36, 34, 33, 30, 38 shown. At the time that the second combined view 700 is being displayed on the TV 402, a first of the communication interfaces 404 such as the primary tuner 406 is utilized to receive the group live-view guide channel 10 and another of the communication interfaces 404 such as the secondary RF tuner 408 is utilized to receive the newly selected channel 39.

Figure 8:
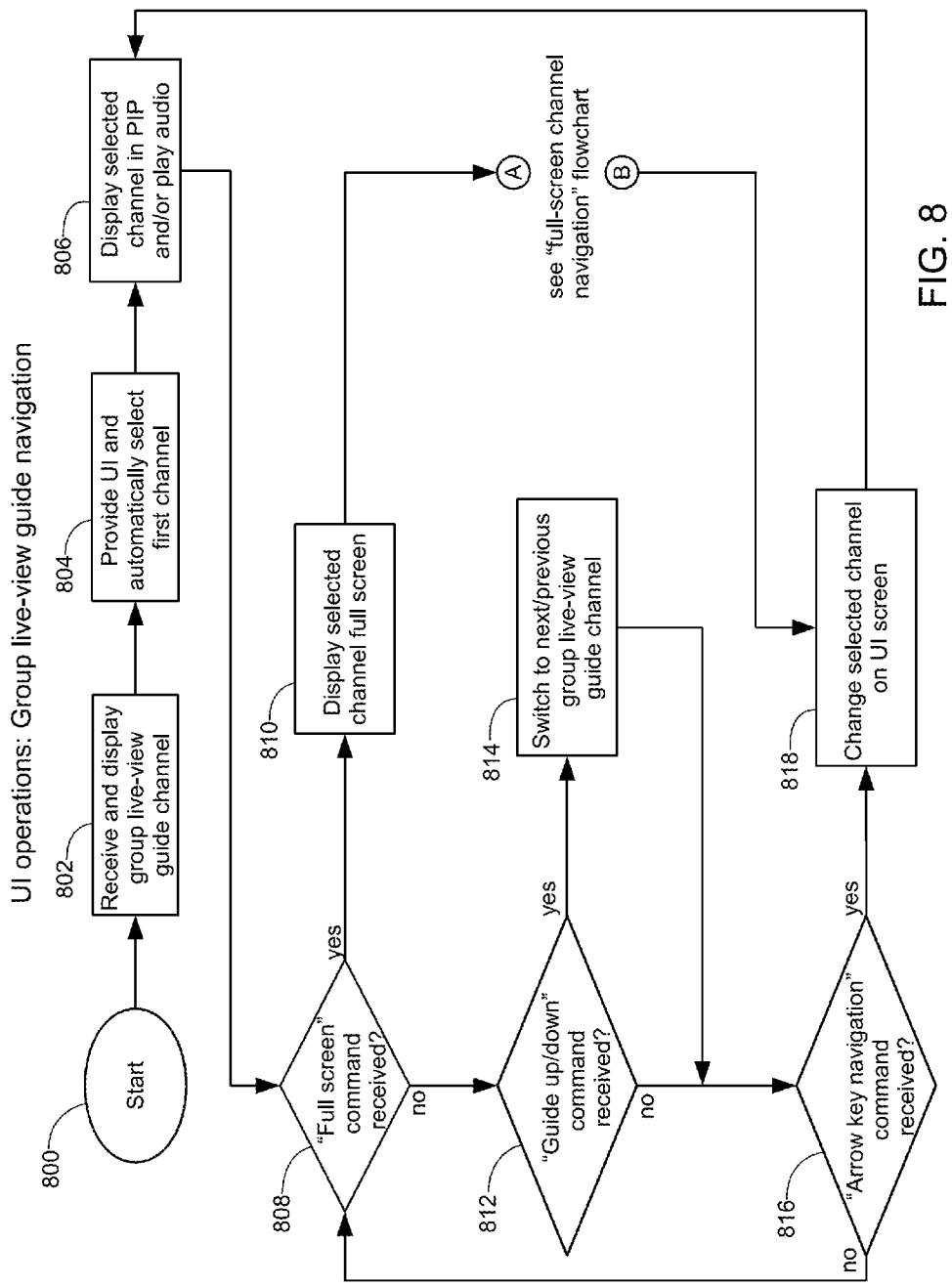
FIGS. 8 and 9 together illustrate a flowchart of operations by the STB of FIG. 4 providing the user interface screen of FIG. 5 in conjunction with the group live-view guide channel stream of FIG. 3 according to an exemplary embodiment of the invention.
Figure 9:
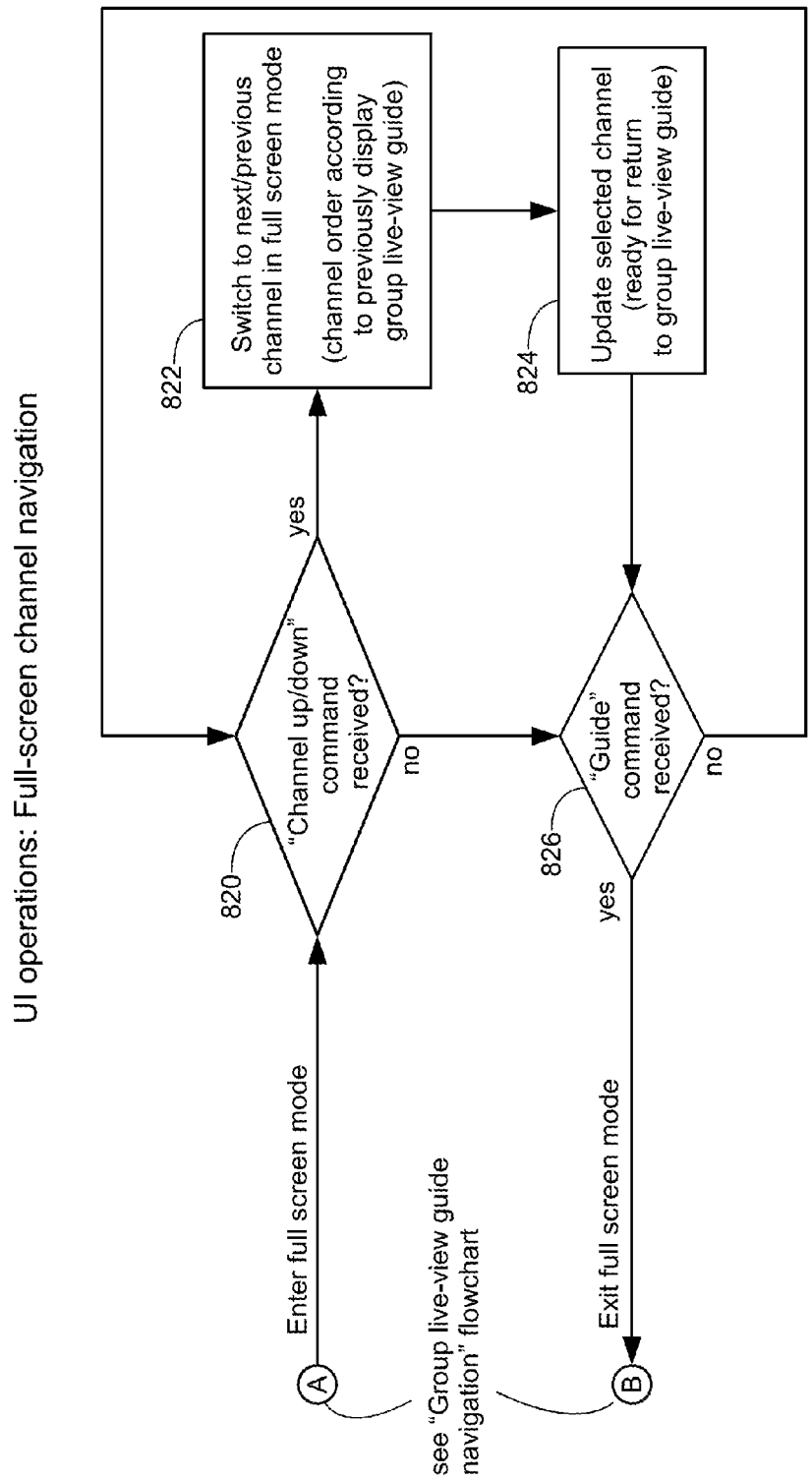

FIGS. 8 and 9 together illustrate a flowchart of operations by the STB 400 providing the user interface (UI) screen 500 in conjunction with the group live-view guide channel stream 10 according to an exemplary embodiment of the invention. The steps of FIG. 8 and FIG. 9 may be performed by the processor 416 of the STB 400 executing the UI controller module 420 and the PIP controller module 418 as loaded from the memory 414. The steps of the flowchart in FIGS. 8 and 9 are not restricted to the exact order shown, and, in other configurations, shown steps may be omitted or other intermediate steps added. In this configuration, the STB 400 performs the following operations:

The process begins at step 800 when the STB 400 enters the group live-view guide mode. The group live-view guide may be entered in any desired manner, for example, when the user presses a "guide" button on the infrared remote control. In another example, the group live-view guide mode may be the default mode of the STB 400 when powered up or the default screen shown when a user chooses to watch television channels available in a hotel.

At step 802, the STB 400 receives the default (or previously selected) group live-view guide channel video stream 10 and displays it on the TV 402. The STB 400 receives the group live-view guide channel 10 via one of the communications interfaces 403. For example, when the group live-view guide channel 10 is being transmitted by the group live-view generator 126 to a particular multicast IP address on the LAN 122, the STB 400 joins that IP multicast address and begins receiving the group live-view guide channel 10 via the Ethernet transceiver 404. Alternatively, when the group live-view guide channel 10 is being transmitted by the group live-view generator 126 on a particular RF QAM channel on the coax network 124, the STB 400 utilizes the primary RF tuner 406 to receive and demodulate that particular RF QAM channel. The received group live-view guide video stream 10 is then outputted by the STB 400 to the TV 402 (or other display device).

At step 804, the STB 400 generates a UI screen and displays it superimposed over top of the group live-view guide channel stream 10 on the TV 402 (or other display device). By default, the STB 400 may automatically select for PIP preview 502 the first channel position (e.g., channel 35 in this example) from the group live-view guide channel 10.

At step 806, the STB 400 receives and decodes the selected channel for larger PIP preview 502 display and/or audio playback. The UI controller 420 has access to a list of channels that are provided on the currently displayed group live-view guide channel 10. For example, assuming the eight channels 35, 39, 32, 36, 34, 33, 30, 38 have position designators 1 to 8 on the UI screen 500, the memory 414 of the STB 400 stores a table similar to Table 1 as follows:

TABLE 1

| Guide preview position to channel mapping | | | | | | | | |
|---|---|---|---|---|---|---|---|---|
| Guide channel | Pos. 1 channel | Pos. 2 channel | Pos. 3 channel | Pos. 4 channel | Pos. 5 channel | Pos. 6 channel | Pos. 7 channel | Pos. 8 channel |
| 10 | 35 | 39 | 32 | 36 | 34 | 33 | 30 | 38 |

According to the position of the selection box 501, the STB 400 looks up the real channel number corresponding to that position and then receives the corresponding real television channel (or other video stream) as indicated in Table 1. For instance, since the guide channel designated by channel No. "10" has a first preview position currently selected and that position corresponds to channel "35", the STB 400 utilizes one of one of the Ethernet transceiver 404, primary RF tuner 406, or secondary RF tuner 408 to receive channel 35. At this point in time, the STB is simultaneously receiving two channels: the group live-view guide channel 10 and the user's selected channel 35. For IP based channels, this involves the STB 400 joining two different IP multicasts corresponding to channels 10 and 35. For QAM based channels, this involves the STB 400 setting the primary RF tuner 406 to channel 10 and the secondary RF tuner 408 to channel 35. Alternatively, one of the channels 10 and 35 may be received via an IP multicast and the other via a QAM channel.

After receiving the user's selected channel (i.e., channel 35 in this example), the STB 400 displays the received channel 35 in the PIP preview 502 and plays the audio content from the received channel 35 on the speakers for the user to hear. The result is the user sees something similar to view 600 illustrated in FIG. 6 on the TV 402 and hears the audio from the hockey game on channel 35 as previewed in PIP preview 502.

The order of the channels in Table 1 and how they line up to the various channel positions on UI 500 may be dynamically retrieved by the STB 400 from the computer server 200 such as when the order of the guide video channel stream 10 changes on a per-user basis, or may be pre-programmed into the memory 414 of the STB 400 such as when the order is the same for all users of the STB 400. Although Table 1 shown above only shows the channel-to-position information for guide channel No. 10, the table may be expanded to specify the various channels and orders for a plurality of different group live-view guide channels. Likewise, the table may be updated at any time to include different channels and/or orders of channels depending on the user currently checked in to the hotel room in which the STB is located.

At step 808, the STB 400 checks whether a "full screen" command has been received. In this embodiment, the full screen command corresponds to the user pressing the "enter" key (or a similar key such as "select") on the infrared remote control in order to confirm the user wishes to full screen view the currently selected channel indicated by selection box 501. When the full screen command is received, control proceeds to step 810; alternatively, control proceeds to step 812.

At step 810, the STB 400 displays the selected channel full screen on the television. In embodiments where the selected channel is previewed in the PIP preview 502, the selected channel is already being received by the STB and this step simply involves the STB 400 maximizing the PIP preview 502 to full screen such that the user can no longer see any of the group live-view guide channel 10 received from the computer server 200 or the corresponding guide UI screen 500 generated by the STB 400.

If PIP preview 502 is not being utilized, step 810 may involve beginning to receive the user's selected channel and then displaying the selected channel full screen. For instance, in a STB 400 capable of only receiving a single channel at a time, the STB 400 may at step 810 stop receiving the group live-view guide channel stream 10 and start receiving and displaying the user's selected channel (i.e., begin receiving and displaying the user's selected video stream full screen).

At step 812, the STB 400 checks whether a guide up/down command has been received. In this embodiment, the guide up/down command will be received when the user presses "channel up/down" buttons on the remote control while viewing a group live-view guide screen 600 such as that shown in FIG. 6, and will also be received when the user presses the arrow/selection keys on the remote control in order to navigate to and select one of the guide change arrows 504/506 shown in FIGS. 5-7. When a channel up/down command has been received, control proceeds to step 814; alternatively, control proceeds to step 816.

At step 814, the STB 400 switches to a next/previous group live-view guide channel video stream. For example, guide channel stream 10 may correspond to a sports theme of eight sports-related channels 35, 39, 32, 36, 34, 33, 30, 38, whereas a next guide channel may correspond to eight news-related channels available at the hotel. Any number of different group live-view guide channels may be available and stream to the STB and the user may cycle through them as desired. Each group live-view guide channel will have a table similar to Table 1 shown above mapping the various live-view preview positions to real channel numbers (or other designators of the original video stream) available at the hotel. In this way, the group live-view guide generators 126 know which original video streams 211 to decode, scale and position on each guide video stream, and the STB 400 knows which original video stream 211 to separately receive and preview in the PIP preview area 502 when a particular position is selected on the guide channel, and also knows which original video stream 211 to display full screen when the receiving the full screen command at step 808.

At step 816, the STB 400 checks whether any arrow navigation commands have been received. In this embodiment, arrow navigation commands will be received whenever the user presses the various up/down/right/left selection arrows on the infrared remote control. These arrows are utilized by the user to move the selection box 501 around the group live-view guide screens 600, 700 such as to change to different guide channels and/or select different channels for PIP preview 502 and/or full screen viewing. When an arrow navigation command has been received, control proceeds to step 818; alternatively, control returns to step 808.

At step 818, the STB 400 changes the selected channel on the UI interface 500. This involves moving the channel selection box 501 to the preview position corresponding to the newly selected channel. For instance, as shown in FIG. 7, the selection box 501 is moved from channel 35 to newly selected channel 39. The selected channel (e.g., newly selected channel 39) is also stored in a temporary memory register in STB memory 414 and control returns to step 806 to a) beginning receiving the newly selected channel, b) update the program information in box 503, c) update the PIP preview 502 and/or d) play the audio for the newly selected channel. For instance, again assuming the selected channel is changed from channel 35 to channel 39, the communication interface 404 that was previously utilized to receive channel 35 is changed at step 806 to now receive the real television channel 39, which is thereafter displayed by the PIP controller 418 in preview position 502 and the audio for the received television channel 39 is played over the TV's 402 speakers. In other embodiments such as those where the STB 400 is not capable of simultaneously receiving two channels, step 408 may be omitted.

At step 820, after full screen mode is entered, the STB 400 checks whether a channel up/down command has been received. Similar to step 812, the channel up/down commands at this step will be received when the user presses "channel up/down" buttons on the remote control while viewing a selected channel full screen. When a channel up/down command is received during full screen mode at step 820, control proceeds to step 822; alternatively, control proceeds to step 826.

At step 822, the STB 400 switches to a next channel in full screen mode according to the order of channels as listed on the previously displayed group live-view guide channel. For example, assuming the previously displayed group live-view guide channel was guide channel "10", Table 1 provided above lists the order of the channels on this guide channel 10 as 35, 39, 32, 36, 34, 33, 30, 38. In this way, if the user is currently watching channel 35 and presses the "channel up" button, the STB 400 switches to channel 39. This is done, for example, by STB 400 stopping receiving channel 35 and switching one of communication interfaces 404 to instead receive the newly selected channel 39. Likewise, if the user again presses channel up, the STB 400 stops receiving channel 39 and begins receiving and displaying full screen channel 32. In this way, the user can channel surf the channels as previewed on the previously viewed group live-view guide channel 10 in the same order as the channels are displayed on that guide video stream 10. For example, the user may be watching the hockey game on channel 35 but will want to periodically check on the golf game on channel 39 and then switch back to channel 35 to continue watching the hockey game. These full screen channel changes can be performed by the user without returning to the group live-view guide mode.

At step 824, the STB 400 updates the stored selected channel within memory 414 to the new channel that is now being displayed full screen. For instance, when the previously selected channel was 35 and the user switches to channel 39, the STB 400 at step 824 updates the record of the selected channel to channel 39. In this way, when the user later returns to the group live-view guide channel 10, the STB 400 will display the UI screen with the last channel the user was viewing full screen as the selected channel indicated by selection box 501 on the group live-view guide UI screen 500.

At step 826, the STB 400 checks whether a return to guide command has been received. In this embodiment, the return to guide command will be received when the user presses a "Guide" button on the STB's infrared remote control device. When the return to guide command has been received, control returns 818 to re-display the group live-view guide channel stream 10 and corresponding UI screen 500 on TV 402, and to automatically select the last channel that was viewed full screen as the selected channel 501 on the UI screen 500 displayed by STB 400. This step may also involve the STB 400 switching one of the communication interfaces 404 to receive the group live-view guide channel 10 if it is not already being received such as in a STB 400 that is only capable of displaying a single video stream at a time.

Figure 10:
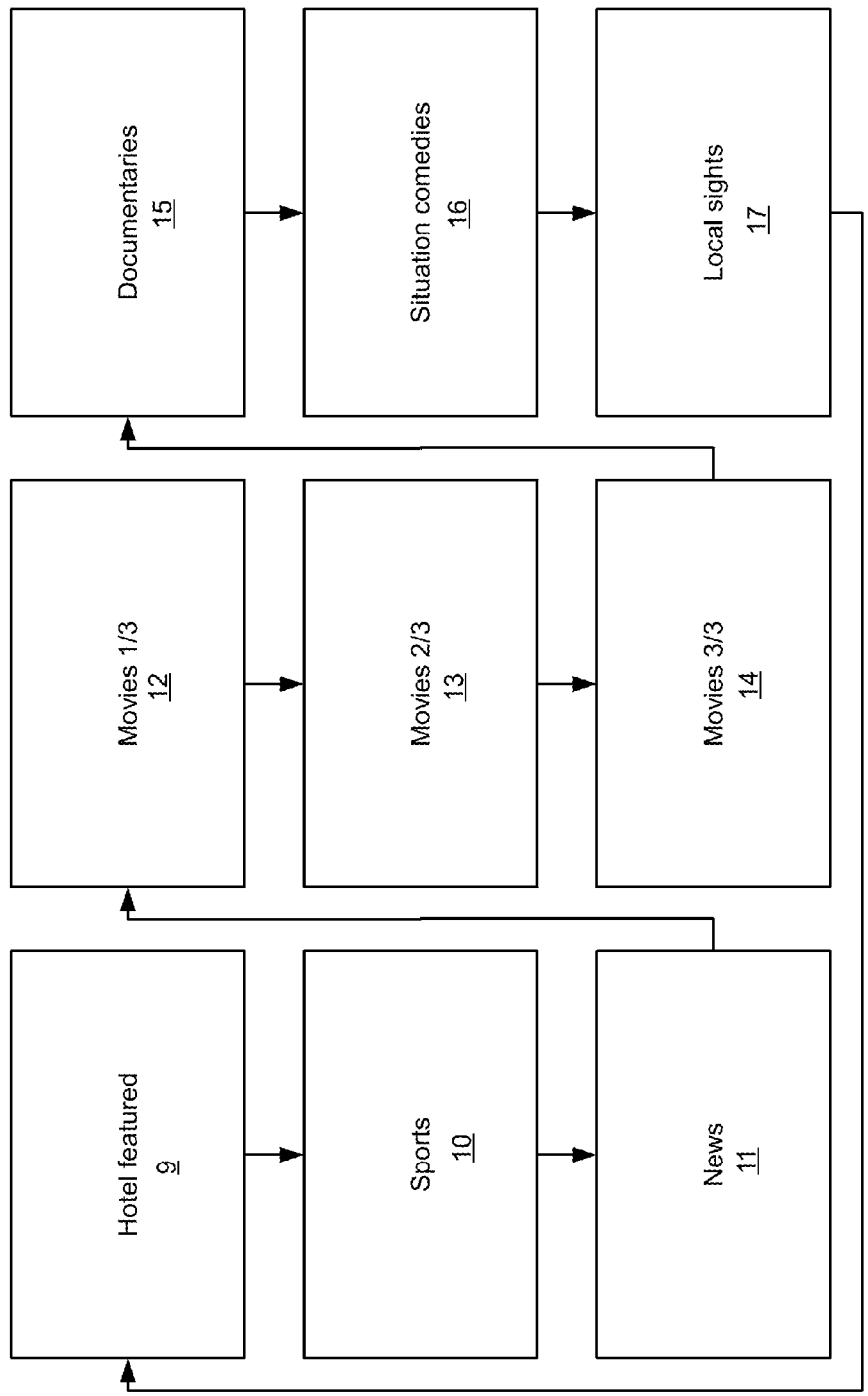
FIG. 10 is a flowchart describing the order of a plurality of different channel guide groupings based on different categories of content according to an exemplary embodiment of the invention.

FIG. 10 is a flowchart describing the order of a plurality of different channel guide groupings based on different categories of content according to an exemplary embodiment of the invention. For instance, as the user changes guide channels at steps 812 and 814 of FIG. 8, the STB 400 may follow the order of guide channels as specified in FIG. 10. That is, if currently displaying the guide channel 10 (e.g., Sports theme) and the user switches to a next guide channel, at step 814 the STB 400 will switch to receiving and displaying guide channel 11 (e.g., a news theme) showing a plurality of news-related channels available at the hotel. A table similar to Table 1 shown above is stored within the memory 414 of the STB 400 and informs the STB of which real television channels to receive and decode depending on which channel position on the guide channel 11 is currently selected via selection box 501. A UI screen similar to the flowchart shown in FIG. 11 may also be displayed to the user on TV 402. In this way, the user may use arrow keys of the infrared remote controller to select any of the group live-view guide channels shown in FIG. 10 for display on TV 402. The steps and channel guide groups of the flowchart in FIG. 10 are not restricted to the exact order shown, and, in other configurations, shown steps and groups may be omitted or other intermediate steps and groups added. In some embodiments, the STB 400 may dynamically select and order the guide channels in FIG. 10 according to user preferences of the guest currently checked into the room in which the STB 400 is located.

Figure 11:
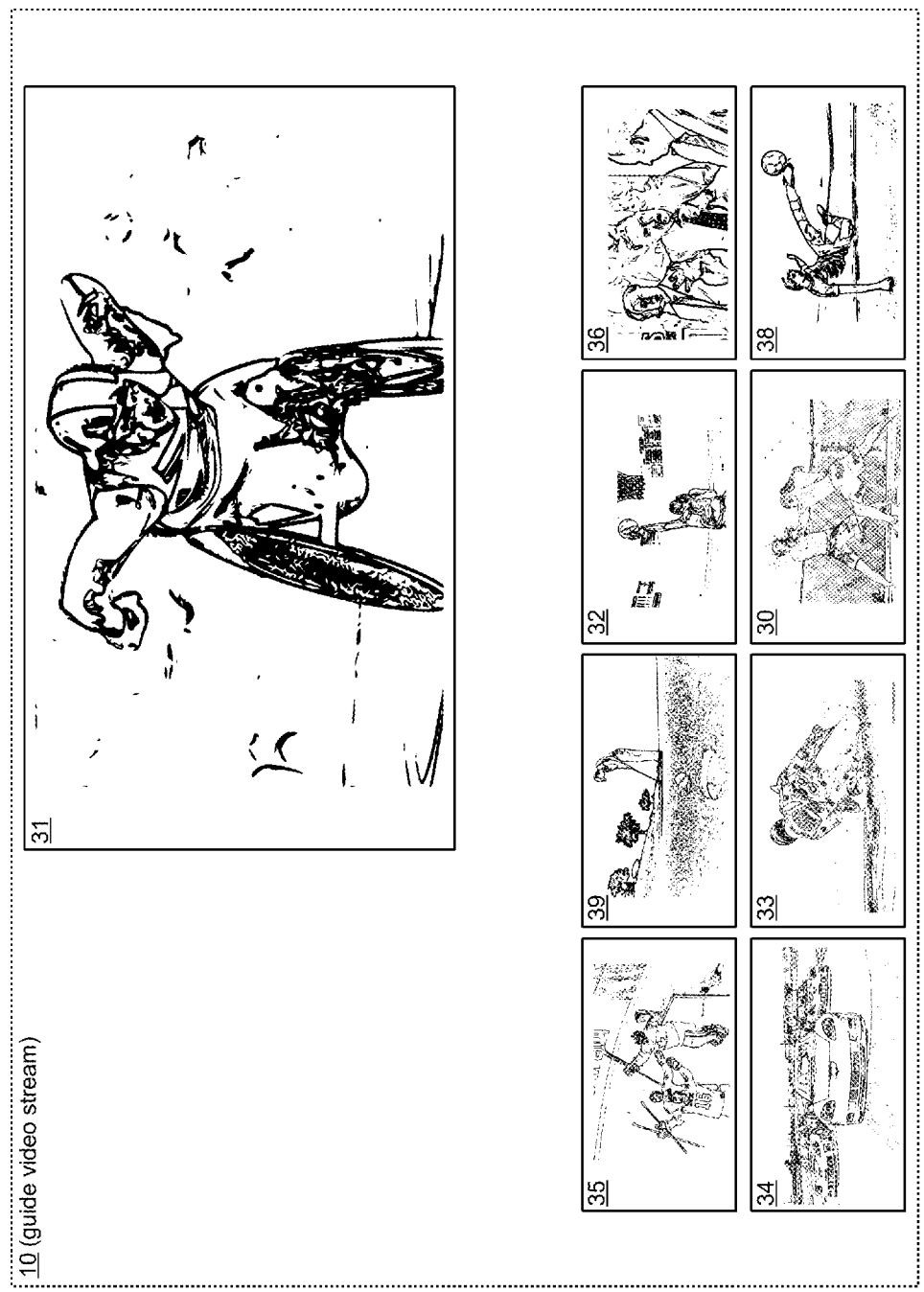
FIG. 11 illustrates an example of a group live-view channel stream as generated by a group live-view generator of FIG. 2 according to another exemplary embodiment.

FIG. 11 illustrates an example of a group live-view channel video stream 10 as generated by a group live-view generator 126 according to another exemplary embodiment. In this embodiment, a featured channel (i.e., channel 31) is shown in a more prominent manner. For instance, channel 31 in this example is resized by the scaling module 214 to a width of 1100 pixels such that it uses over one half the width of the group live-view video stream 10 and is positioned in the upper right corner. In this embodiment, rather than reserving a space for a dynamically changing PIP preview 502, channel 31 is always displayed by the guide generator 126 in the larger more prominent position in the upper right. As before, each of channels 31, 35, 39, 32, 36, 34, 33, 30, 38 shown on the group live-view guide channel stream 10 are video previews playing in real time such that the user can see the action on each of these channels simply by tuning to the group live-view channel 10 on STB 400. As before, the STB 400 also displays a UI screen 1200 (see FIG. 12) in conjunction with the group live-view channel 10 of FIG. 11 in order to allow the user to select any of the channels 31, 35, 39, 32, 36, 34, 33, 30, 38 for full screen viewing.

Figure 12:
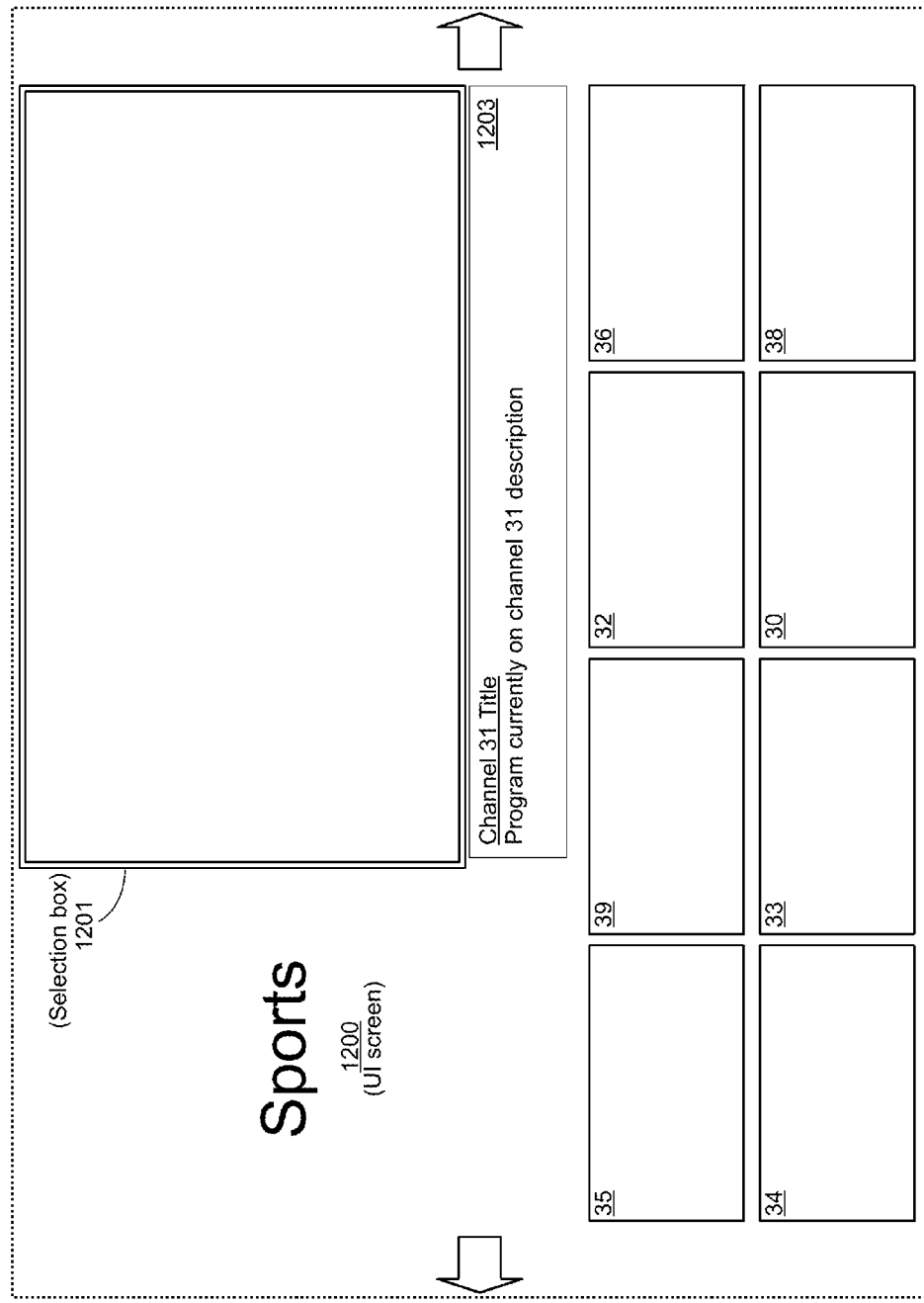
FIG. 12 illustrates a user interface (UI) screen provided by the STB of FIG. 4 in conjunction with the group live-view channel stream of FIG. 11 according to an exemplary embodiment of the invention.

FIG. 12 illustrates a user interface (UI) screen 1200 provided by the STB 400 in conjunction with the group live-view channel 10 of FIG. 11 according to an exemplary embodiment of the invention. In this embodiment, the PIP controller 418 is not utilized and may be omitted. A lower cost STB 400 may therefore be utilized that does not include a PIP controller 418. In some embodiments the STB 400 may only include communication interface(s) 404 capable of receiving a single television channel at a time so that PIP functionality is not possible. As illustrated in FIG. 12, the STB 400 only needs to be capable of displaying a UI screen 1200 consisting of selection box 1201 and metadata text in a program information box 1202 over top of the received group live-view guide channel 10. Alternatively, the PIP controller 418 may be included but only utilized to receive the real television channel or other video stream according to the user's selection in order to playback the audio of the user's selected channel indicated by selection box 1201.

Figure 13:
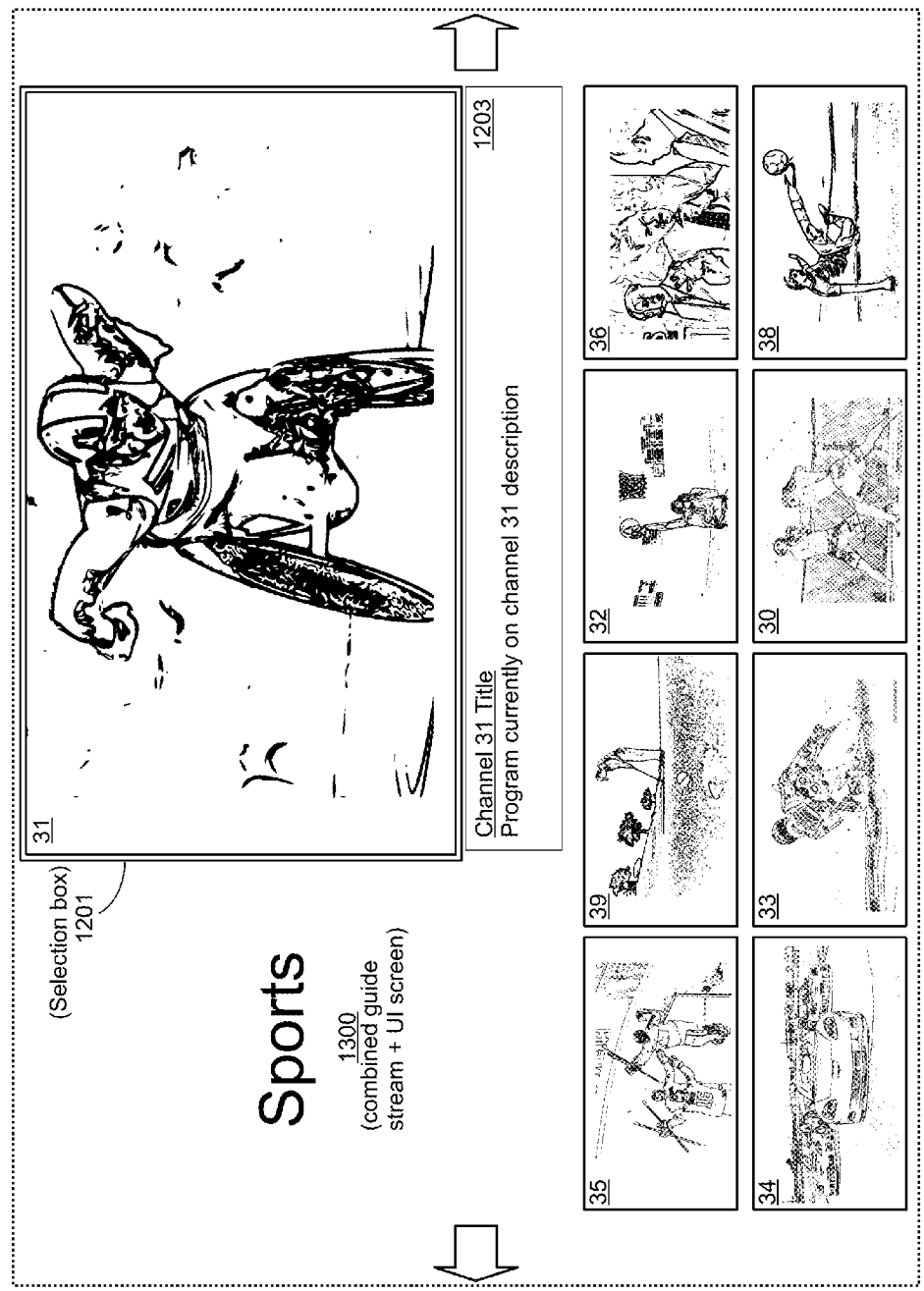
FIG. 13 illustrates a combined view of the UI screen of FIG. 12 superimposed over the group live-view guide channel stream of FIG. 11 as seen by the user of the STB when a first channel is selected.

FIG. 13 illustrates a combined view 1300 of UI screen 1200 superimposed over the group live-view guide channel 10 of FIG. 11 as seen by the user of the STB 400 when channel 31 is selected. The STB 400 firstly receives and displays the group live-view guide channel 10 on the TV 402. Then, the UI screen 1200 provided by the STB is superimposed over the group live-view guide channel 10 on the TV 402. The program information box 1203 includes details of the selected channel 31 obtained from metadata available to the STB 400. Further, the user can also see what is playing on each of the channels 31, 35, 39, 32, 36, 34, 33, 30, 38 as playing on the group live-view guide channel 10 also visible on view 1300, and the user can use the arrow keys on the infrared remote control of the STB 400 to move the selection box 1201 to select any of the other channels 35, 39, 32, 36, 34, 33, 30, 38 shown. Optionally, the PIP controller 418 (if available) receives the user's selected channel (e.g., real television channel 31 in the example illustrated in FIG. 13) and plays the audio.

Figure 14:
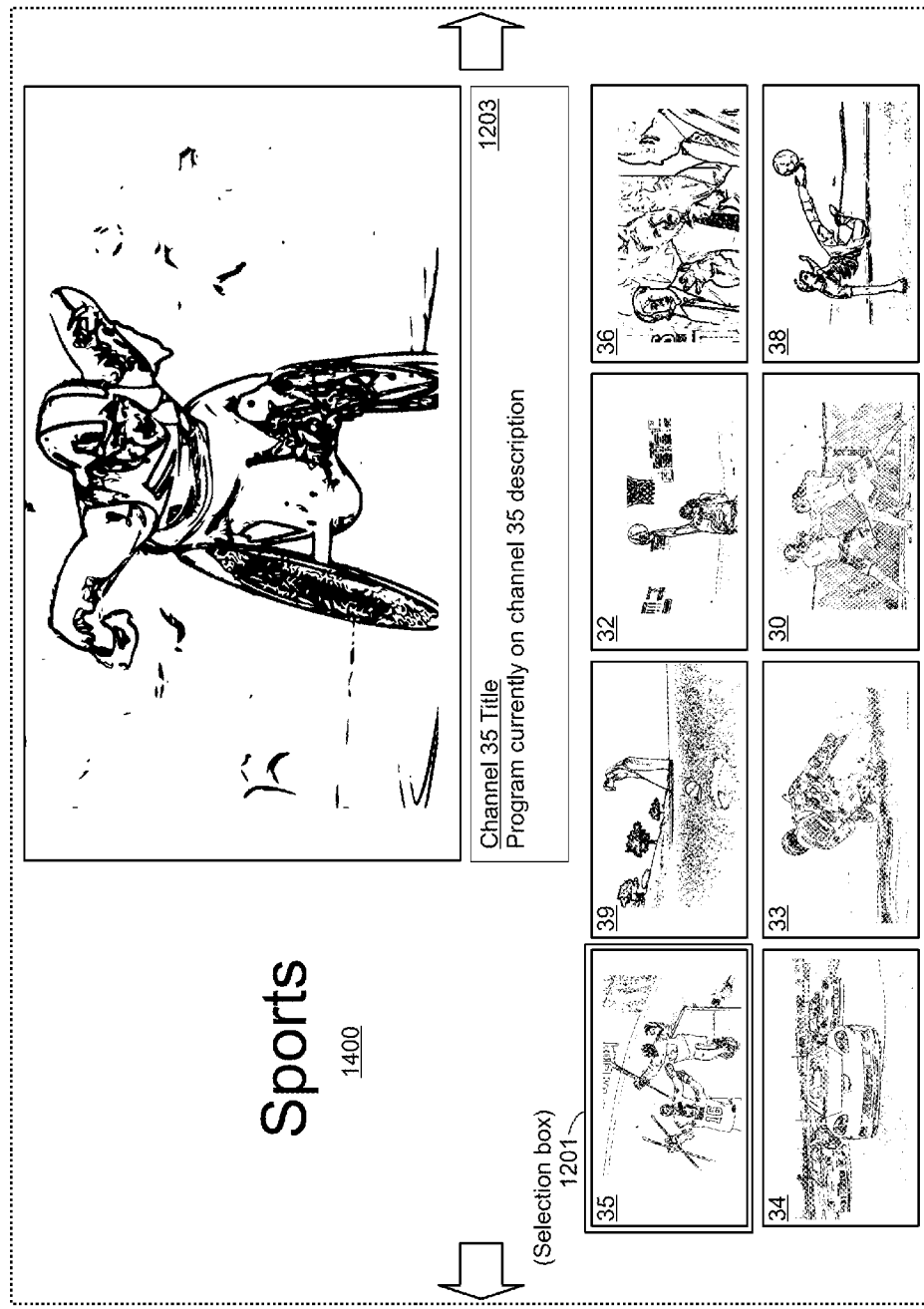
FIG. 14 illustrates a combined view of the UI screen of FIG. 12 superimposed over the group live-view guide channel stream of FIG. 11 after the user has selected a second channel.

FIG. 14 illustrates a combined view 1400 of UI screen 1200 superimposed over the group live-view guide channel 10 of FIG. 11 after the user has selected a non-featured channel 35. As shown, the selection box 1201 is moved by the STB 400 to now select channel 35 and the program information box 1203 has been updated with the metadata for channel 35. The user is still able to see what is playing on all of channels 31, 35, 39, 32, 36, 34, 33, 30, 38 from the live-view guide channel 10 of FIG. 11 under the UI screen 1200 and may select any of the visible channels 31, 35, 39, 32, 36, 34, 33, 30, 38 for full screen. Optionally, the PIP controller 418 (if available) receives the user's selected channel (e.g., channel 35 in the example of FIG. 14) and plays the audio. In response to the user pressing a full screen button or otherwise activating full screen mode for the selected channel 1201, similar to as previously described in the "display selected channel full screen" step 810 of FIG. 8, the selected channel is received and displayed full screen.

In some embodiments, rather than playing audio of the user's selected channel at step 806, step 806 may be omitted so that the views 1300, 1400 shown FIGS. 13-14 are suitable and may be utilized with a STB 400 that does not support PIP functionality and/or that can only receive and display a single television channel at a time.

Figure 15:
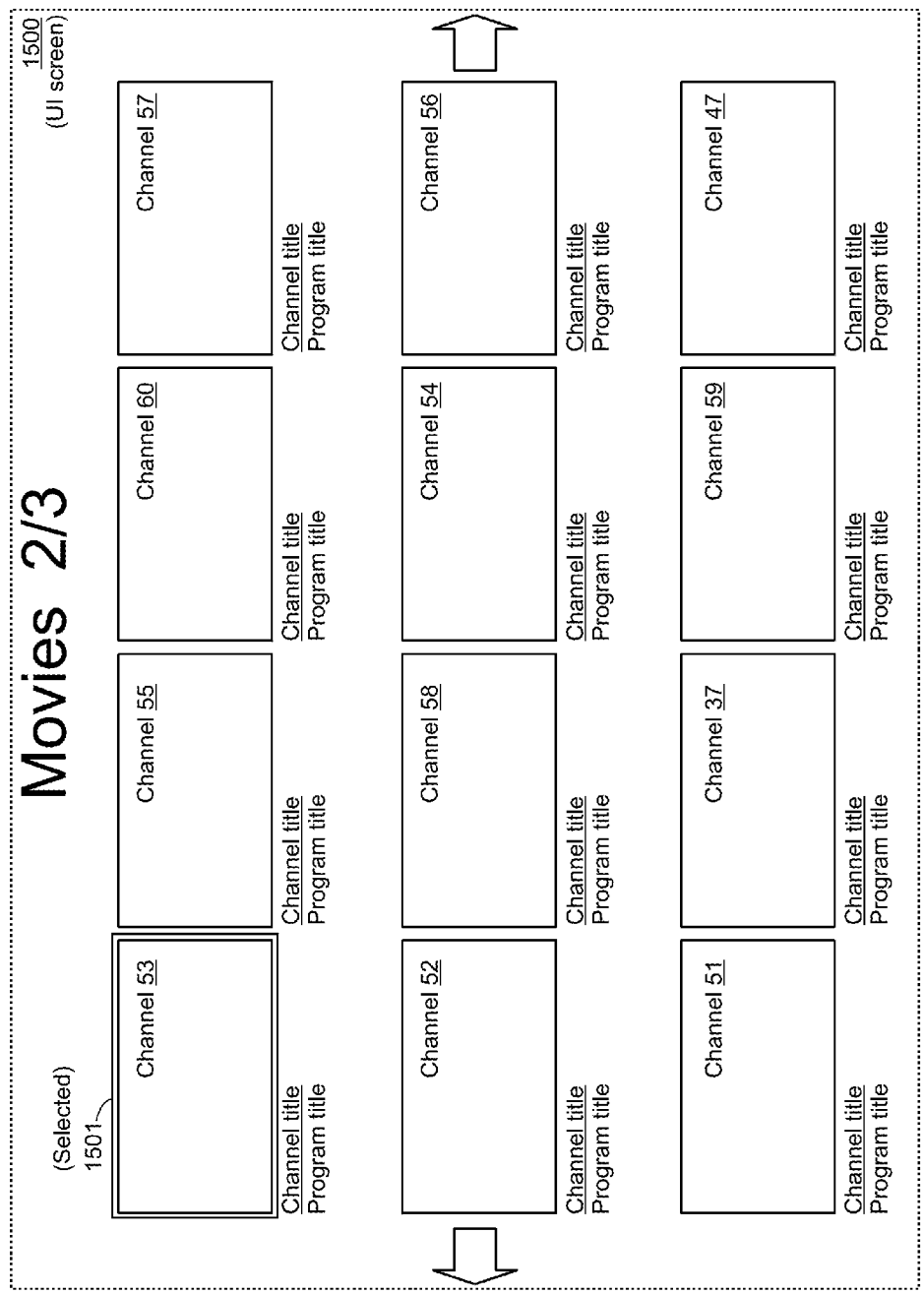
FIG. 15 illustrates a user interface (UI) screen for use in conjunction with a guide video stream laid out in equally spaced grid format according to an exemplary embodiment of the invention.

Other layouts of group live-view guide channels and corresponding UI screens are also possible. For example, FIG. 15 illustrates a user interface (UI) screen 1500 for use in conjunction with a guide video stream laid out in equally spaced grid format according to an exemplary embodiment of the invention. In this embodiment, the guide video channel stream includes live previews of what is playing on up to twelve different channels of content available at the hotel. Each of the twelve positions corresponds to one of television channels 53, 55, 60, 57, 52, 58, 54, 56, 51, 37, 59, 47 in the order and positions illustrated in FIG. 15. A table similar to Table 1 set forth earlier is stored in the memory 414 of STB 400 and maps between the various twelve positions and their corresponding real television channels (or other video stream designators such as multicast IP address). This layout may be utilized with a STB 400 lacking PIP functionality, or PIP functionality may be used only for audio reception of the user's selected channel indicated by selection box 1501. In other words, step 806 of FIG. 8 may be omitted or modified to only receive the selected channel in order to play its audio over the speakers. With the latter choice, as the user moves the selection box 1501 around different channels on UI screen 1500 (before selecting a particular channel for full screen viewing), the user can hear the audio content of the currently selected channel without having to enter full screen mode for that channel.

Figure 16:
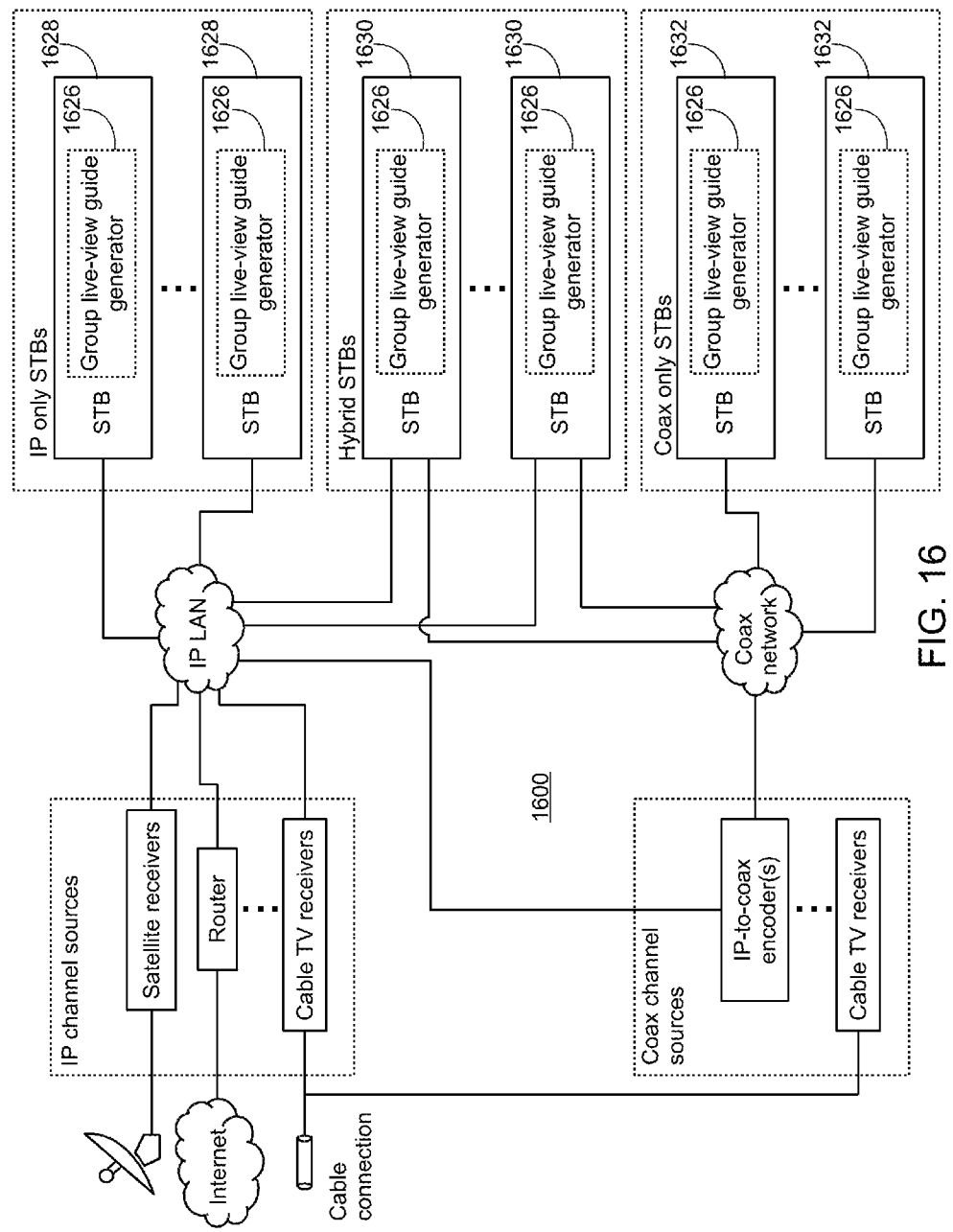
FIG. 16 illustrates a media system with the group live-view guide generators integrated within the set-top boxes (STBs) according to an exemplary embodiment of the invention.

FIG. 16 illustrates a media system 1600 with the group live-view guide generators 1626 integrated within the set-top boxes (STBs) 1628, 1630, 1632 according to an exemplary embodiment of the invention. Unlike the system 100 of FIG. 1, in FIG. 16 there are no centrally located group live-view guide generators 126 in the system 1600, instead each of the individual STBs 1628, 1630, 1632 includes its own group live-view guide generator 1626.

The group-live view guide generators 1626 may be implemented very similar to as shown earlier in FIG. 2, except rather than software modules 212, 214, 216, 218 being stored in the memory 204 of a headend computer server 200, these modules 212, 214, 216, 218 are stored in the memory 414 of the STB 400, for example. Again, the modules 212, 214, 216, 218 in one embodiment represent software modules that contain instructions executed by the processor 416 of the STB 400; in other embodiments, the modules 212, 214, 216, 218 may also represent hardware modules such as ASIC chip(s) dedicated to performing the described functions for these modules.

Another difference with the media system of 1600 in FIG. 16 is that each of the STBs 1628, 1630, 1632 operating according to the techniques of this embodiment must be capable of simultaneously receiving and working with a plurality of incoming television channels 211, which are inputted to the various channel decoding modules 212 in order to generate the guide video streams on demand. Again with reference to FIG. 4, the communication interfaces 403 of the STB 400 may include any number of Ethernet transceivers and/or RF tuners available for this purpose. In particular, the IP-only STBs 1628 include one or more Ethernet transceiver 404 together capable of simultaneously receiving multiple IP-based incoming television channels 211 (one for each of the channels shown on the group live-view guide). Alternatively, the coax-only STBs 1632 include a plurality primary RF tuners 406, secondary RF tuners 408 (and possibly additional RF tuners, not shown) sufficient in number to simultaneously receive and decode all of the coax-based incoming television channels 211 for display on the group live-view guide. Likewise, a hybrid STB may include both Ethernet transceivers 404 and RF tuners 406, 408 capable of simultaneously receiving the various incoming television channels 211 via both LAN and coax networks.

A particular group live-view guide generator 1626 only needs to operate when the user of the STB 400 is currently viewing a group live-view guide such as the views 600, 1300 shown in FIG. 6 and FIG. 13, for example. Once the user selects to view a particular television channel in full screen, the particular group live-view guide generator 1626 may stop generating the group live-view guide and the STB may instead utilize its processing resources 416 for other purposes. In this way, the system 1600 of FIG. 16 moves the group live-view guide processing requirements to the clients (i.e., STBs 1628, 1630, 1632) where each client need only generate the desired group live-view guide if and when required according the user of that client. This architecture may lower the overall cost of system 1600 when the STBs 1628, 1630, 1632 already have sufficient processing power and communication interfaces to generate their own group live-view guide(s) based on a plurality of original video streams 211.

A combination of system 100 of FIG. 1 and system 1600 of FIG. 16 may also be employed. For example, some high-performance STBs 1628 may include their own group live-view guide generators 1626, while other low-performance STBs 128 may receive and operate using group live-view channel streams received from one or more head-end-based group live-view generator(s) 126 located on a LAN 122 or coax network 124 coupled to the STBs 128.

Other features may be integrated with the above described systems 100, 1600. For example, to increase user enjoyment, specific group live-view guides may be dynamically generated to preview television channels or other video streams on a user-specific basis. For example, with the system 1600 of FIG. 16, when a new guest checks into a hotel room, the STB(s) 1628, 1630, 1632 in the guest's assigned room may be reprogrammed with a list of the user's favorite channels as retrieved from an Internet-based user profile server (not shown) or other source. The in-room STB(s) 1628, 1630, 1632 then by default show a group live-view guide channel view 600, 1300 previewing the guest's specific channels. In another example, with the system 100 of FIG. 1, a hotel administrator may access an admin console in order to configure a list of featured channels that are to be shown on a "hotel featured" group live-view guide channel. The hotel may monetize the group live-view guide channels by accepting payments from channel producers or advertisers in order to feature specific channels and/or content on particular group live-view guide channels.

It is also not a requirement that all television channels and/or content available at the hotel be featured on at least one group live-view guide channel. Instead, older style menus such as IPGs and EPGs with scrolling text and textual-based interactive menuing systems may be utilized for other channels (e.g., less popular channels) in conjunction with the techniques described herein. For instance, in some embodiments, there may only be a single group live-view guide channel 10 showing live previews of eight (or any other number) of channels whereas all other channels available at the hotel are not live-previewed on any group guide stream. This reduces the number of group live-view guide generators 126, 1626 required in the system 100, 1600 while still giving the users the benefit of the group live-view guide for at least some channels of television channel content available at the hotel.

Even if all channels and content available in the hotel are previewed on at least one group live-view guide channel, older style EPG/IPG content guides may also be made available in the systems 100, 1600 as some users may still prefer to browse content using the older more familiar style EPG/IPG. For example, a user may utilize the older style EPG/IPG to check what upcoming programs on a particular channel are going to be playing at a later time or date rather than the currently playing content shown on the group live-view guide. Furthermore, the group live-view guide may include buttons or more text in the program information box 503, 1203 (not shown) that allow the user to see content playing at future times for the selected channel. For example, when the user has selected channel 35, they may press an "upcoming" button available on either of the infrared remote controller or on screen button in order to see a list of programs that will be shown on that channel in the future.

In summary of an exemplary embodiment, one or more processors receive a plurality of original video streams, generate a guide video stream that includes each of the original video streams resized and arranged such that all of the original video streams are simultaneously visible and playing on the guide video stream, and display the guide video stream on a display device. The one or more processors further provide an interactive user interface on the display device in conjunction with the guide video stream to thereby allow a user of the set-top box to select one of the original video streams shown playing on the guide video stream for full screen playback. In response to the user selecting a particular original video stream for full screen playback, the one or more processors play full screen on the display device the particular original video stream as selected by the user.

Although the invention has been described in connection with preferred embodiments, it should be understood that various modifications, additions and alterations may be made to the invention by one skilled in the art without departing from the spirit and scope of the invention as defined in the appended claims. For example, rather than superimposing the UI screen 500 generated by the STB 400 over top of the group live-view guide channel stream 10, the background of the guide channel 10 may be transparent and superimposed over the top of the UI screen 500 for display on the TV 402. Additionally, although the above description has focused on showing a group live-view guide video stream 10 showing previews of a plurality of television channels, in general any original video streams 211 can be previewed and it is not a requirement that the incoming video streams be television channels. Examples of original video streams 211 that may be previewed as channels on the group live-view guide stream 10 include television channels, video-on-demand media content, pay-per-view events, repeating advertisement reals, hotel or venue information, schedules, weather reporting, Internet video streams and webcasts, etc. In another example, other types of STB remote control devices can be utilized instead of or in addition to an infrared remote control; for instance, the user's mobile phone running a predetermined app may be used to allow the user of the STB to interact with the UI screen 500 displayed by the STB 400 in conjunction with the guide video stream 10.

In the above description, the exemplary user indication of "guest" is utilized to refer to users as it common for customers of a hospitality establishment to be referred to as guests. However, it is not a requirement that users must be customers of the hospitality establishment and the term "guest" in this description includes other users such as current guests in a hotel, people who are attending a conference or meeting in a hotel, staff members at the establishment, or any other person or user who may need or want to access a services at a hospitality establishment. Future guests that have reservations, potential future guests that don't yet have reservations, and other users may also make use of the invention. For example, a demonstration of the technology may be available in a hotel lobby and all users would be able to try out the system 100, 1600.

Although the invention has been described as being utilized at a hotel for illustration purposes, the present invention is equally applicable to any hospitality related location or establishment providing video content to users including but not limited to hotels, motels, resorts, hospitals, apartment/townhouse complexes, restaurants, retirement centers, cruise ships, busses, airlines, airports, shopping centers, passenger trains, libraries, coffee shops, hotspots, etc. Additionally, the invention is applicable outside of the hospitality industry such as for use by a residential television provider and other media providers in addition to the above-described hospitality examples.

The various separate configurations, elements, features, embodiment, and modules of the invention described above may be integrated or combined. One or more processors may operate pursuant to instructions stored on a tangible, non-transitory computer-readable medium to perform the above-described functions. Examples of the computer-readable medium include optical media (e.g., CD-ROM, DVD discs), magnetic media (e.g., hard drives, diskettes), and other electronically readable media such as flash storage devices and memory devices (e.g., RAM, ROM). The computer-readable medium may be local to the computer executing the instructions, or may be remote to this computer such as when coupled to the computer via a computer network such as the Internet 112. The one or more processors may be included in a general-purpose or specific-purpose computer that becomes a special purpose machine performing the above-described functions as a result of executing the instructions. In another example, rather than being software modules executed by one or more processors, the described functionality may be implemented as hardware modules configured to perform the above-described functions. Examples of hardware modules include all forms of programmable logic chips (PLDs), application specific integrated circuits (ASICs), field programmable gate arrays (FPGAs), as well as discrete circuit components. Functions of single modules and devices as described may be separated into multiple units, or the functions of multiple modules and devices may be combined into a single unit. Unless otherwise specified, features described may be implemented in hardware or software (including firmware) according to different design requirements. In addition to a dedicated physical computing device, the word "server" may also mean a service daemon on a single computer, virtual computer, or shared physical computer or computers, for example. Additionally, all combinations and permutations of the above described features and embodiments may be utilized in conjunction with the invention.

What is claimed is:

1. A media system of a hospitality establishment comprising:
   a computer server having a first processor, a first memory, and a first communication interface; and
   a set-top box located in a particular guest room of the hospitality establishment and having a second processor, a second memory, and a second communication interface, the set-top box further including a first radio frequency (RF) tuner and a second RF tuner together capable of simultaneously receiving two respective video streams via the second communication interface;
   wherein, by the first processor executing first software loaded from the first memory, the computer server is configured to detect an event occurrence and in response to the event occurrence:
      retrieve user information corresponding to a guest assigned to the particular guest room from a user profile server via an external computer network,
      select a plurality of original video streams from a plurality of available original video streams according to the user information,
      receive the plurality of original video streams via the first communication interface,
      dynamically generate a guide video stream that includes each of the original video streams resized and arranged such that all of the original video streams are simultaneously visible and playing on the guide video stream at a plurality of first positions and such that the guide video stream further includes a reserved space for a picture-in-picture preview area, wherein the reserved space for the picture-in-picture preview area does not overlap with the plurality of first positions,
      transmit the guide video stream to the set-top box, and
      send to the set-top box RF channel details for the plurality of original video streams playing at each of the plurality of first positions; and
   by the second processor executing second software loaded from the second memory, the set-top box is configured to:
      utilize the first RF tuner to receive the guide video stream from the computer server,
      display the guide video stream on a display device,
      provide an interactive user interface on the display device in conjunction with the guide video stream to thereby allow a user of the set-top box to select one of the original video streams shown playing on the guide video stream for preview,
      in response to the user selecting a particular original video stream for preview, utilize the RF channel details to determine a particular RF channel that corresponds to a position of the particular original video stream selected by the user on the guide video stream, change the second RF tuner to receive the particular RF channel, play an audio portion of the particular original video stream on one or more speakers while continuing to display the guide video stream on the display device, and further play a video portion of the particular original video stream as a preview resized and superimposed over the picture-in-picture preview area of the guide video stream such that the original video streams shown playing on the guide video stream within the first positions are all still visible and playing along with the preview on the display device, the second RF tuner receiving the particular original video stream simultaneously with the first RF tuner receiving the guide video stream,
      while the preview of the particular original video stream is being played superimposed over the picture-in-picture preview area of the guide video stream, allow the user to select the particular original video stream for full screen playback via the interactive user interface, and
      in response to the user selecting the particular original video stream for full screen playback, play full screen on the display device the particular original video stream already being received via the second RF tuner.

2. The media system of claim 1, wherein:
the computer server is further configured to resize and arrange the original video streams on the guide video stream in a particular order;
after beginning to play the particular original video stream full screen on the display device, the set-top box is further configured to allow the user to cycle through full screen playback of the original video streams included on the guide video stream; and
the set-top box is configured to control an order that the user can cycle through full screen playback of the original video streams to match the particular order that they are arranged on the guide video stream.

3. The media system of claim 1, wherein:
the computer server is further configured to:
receive the plurality of available original video streams via the first communication interface,
generate a plurality of guide video streams, each particular guide video stream including a respective subset of the available original video streams resized and arranged such that all of the respective subset of the available original video streams are simultaneously visible and playing on the particular guide video stream, and
transmit the guide video streams to the set-top box via the first communication interface; and
the set-top box is further configured to:
allow the user to select one of the guide video streams for display on the display device,
provide the interactive user interface on the display device in conjunction with a selected guide video stream to thereby allow the user to select one of the available original video streams playing on the selected guide video stream for full screen playback, and
in response to the user selecting a particular available video stream for full screen playback, play full screen on the display device the particular available video stream as received via the second communication interface.

4. The media system of claim 1, wherein the event occurrence is a new guest checking in to the particular guest room.

5. The media system of claim 1, wherein the user information comprises one or more specific channels and the computer server selects the plurality of original video streams to include the specific channels.

6. The media system of claim 1, wherein the computer server includes at least one RF tuner coupled to a coax network and utilizes the at least one RF tuner to receive at least one of the original video streams.

7. The media system of claim 1, wherein the computer server includes at least one Internet protocol (IP) network interface coupled to an IP-based computer network and utilizes the at least one IP network interface to receive at least one of the original video streams.

8. A method of providing media in a media system of a hospitality establishment, the method comprising:
detecting an event occurrence by a computer server;
in response to detecting the event occurrence, retrieving by the computer server user information corresponding to a guest assigned to a particular guest room of the hospitality establishment from a user profile server via an external computer network,
selecting a plurality of original video streams from a plurality of available original video streams according to the user information;
receiving the plurality of original video streams at the computer server;
dynamically generating, by the computer server, a guide video stream that includes each of the original video streams resized and arranged such that all of the original video streams are simultaneously visible and playing on the guide video stream at a plurality of first positions and such that the guide video stream further includes a reserved space for a picture-in-picture preview area, wherein the reserved space for the picture-in-picture preview area does not overlap with the plurality of first positions;
transmitting the guide video stream from the computer server to a set-top box located in the particular guest room;
sending to the set-top box RF channel details for the plurality of original video streams playing at each of the plurality of first positions;
receiving the guide video stream at the set-top box via a first RF tuner included in the set-top box;
displaying the guide video stream on a display device by the set-top box;
providing, by the set-top box, an interactive user interface on the display device in conjunction with the guide video stream to thereby allow a user of the set-top box to select one of the original video streams shown playing on the guide video stream for preview;
utilizing the RF channel details to determine a particular RF channel that corresponds to a position of a particular original video stream selected by the user on the guide video stream;
changing a second RF tuner included in the set-top box to receive the particular RF channel by the set-top box in response to the user selecting the particular original video stream for preview;
playing an audio portion of the particular original video stream on one or more speakers while continuing to display the guide video stream on the display device by the set-top box, and further playing a video portion of the particular original video stream as a preview resized and superimposed over the picture-in-picture preview area of the guide video stream such that the original video streams shown playing on the guide video stream within the first positions are all still visible and playing along with the preview on the display device, the second RF tuner receiving the particular original video stream simultaneously with the first RF tuner receiving the guide video stream;
allowing the user to select the particular original video stream for full screen playback via the interactive user interface while the preview of the particular original video stream is being played superimposed over the picture-in-picture preview area of the guide video stream; and
in response to the user selecting the particular original video stream for full screen playback, playing full screen on the display device the particular original video stream already being received via the second RF tuner by the set-top box.

9. The method of claim 8, further comprising:
resizing and arranging the original video streams on the guide video stream in a particular order by the computer server;

allowing the user to cycle through full screen playback of the original video streams included on the guide video stream by the set-top box after beginning to play the particular original video stream full screen on the display device; and controlling by the set-top box an order that the user can cycle through full screen playback of the original video streams to match the particular order that they are arranged on the guide video stream.

10. The method of claim 8, further comprising:

receiving the plurality of available original video streams by the computer server;

generating a plurality of guide video streams by the computer server, each particular guide video stream including a respective subset of the available original video streams resized and arranged such that all of the respective subset of the available original video streams are simultaneously visible and playing on the particular guide video stream;

transmitting the guide video streams from the computer server to the set-top box;

allowing the user to select one of the guide video streams for display on the display device by the set-top box;

providing by the set-top box the interactive user interface on the display device in conjunction with a selected guide video stream to thereby allow the user to select one of the available original video streams playing on the selected guide video stream for full screen playback; and in response to the user selecting a particular available video stream for full screen playback, playing full screen on the display device the particular available video stream as received by the set-top box.

11. The method of claim 8, wherein the event occurrence is a new guest checking in to the particular guest room.

12. The method of claim 8, wherein the user information comprises one or more specific channels and the method further includes selecting the plurality of original video streams to include the specific channels.

13. The method of claim 8, further comprising providing at least one RF tuner coupled to a coax network and utilizing the at least one RF tuner to receive at least one of the original video streams.

14. The method of claim 8, further comprising providing at least one Internet protocol (IP) network interface coupled to an IP-based computer network and utilizing the at least one IP network interface to receive at least one of the original video streams.

15. A non-transitory processor-readable medium comprising a plurality of processor executable instructions that when executed by one or more processors cause the one or more processors to perform steps of:

detecting an event occurrence by a computer server;

in response to detecting the event occurrence, retrieving by the computer server user information corresponding to a guest assigned to a particular guest room of a hospitality establishment from a user profile server via an external computer network;

selecting a plurality of original video streams from a plurality of available original video streams according to the user information;

receiving the plurality of original video streams at the computer server;

dynamically generating, by the computer server, a guide video stream that includes each of the original video streams resized and arranged such that all of the original video streams are simultaneously visible and playing on the guide video stream at a plurality of first positions and such that the guide video stream further includes a reserved space for a picture-in-picture preview area, wherein the reserved space for the picture-in-picture preview area does not overlap with the plurality of first positions;

transmitting the guide video stream from the computer server to a set-top box located in the particular guest room;

sending to the set-top box RF channel details for the plurality of original video streams playing at each of the plurality of first positions;

receiving the guide video stream at the set-top box via a first RF tuner included in the set-top box;

displaying the guide video stream on a display device by the set-top box;

providing, by the set-top box, an interactive user interface on the display device in conjunction with the guide video stream to thereby allow a user of the set-top box to select one of the original video streams shown playing on the guide video stream for preview;

utilizing the RF channel details to determine a particular RF channel that corresponds to a position of a particular original video stream selected by the user on the guide video stream;

changing a second RF tuner included in the set-top box to receive the particular RF channel by the set-top box in response to the user selecting the particular original video stream for preview;

playing an audio portion of the particular original video stream on one or more speakers while continuing to display the guide video stream on the display device by the set-top box, and further playing a video portion of the particular original video stream as a preview resized and superimposed over the picture-in-picture preview area of the guide video stream such that the original video streams shown playing on the guide video stream within the first positions are all still visible and playing along with the preview on the display device, the second RF tuner receiving the particular original video stream simultaneously with the first RF tuner receiving the guide video stream;

allowing the user to select the particular original video stream for full screen playback via the interactive user interface while the preview of the particular original video stream is being played superimposed over the picture-in-picture preview area of the guide video stream; and in response to the user selecting the particular original video stream for full screen playback, playing full screen on the display device the particular original video stream already being received via the second RF tuner by the set-top box.

16. The non-transitory processor-readable medium of claim 15, wherein the processor executable instructions further cause the one or more processors to perform steps of:

resizing and arranging the original video streams on the guide video stream in a particular order by the computer server;

after beginning to play the particular original video stream full screen on the display device, allowing the user to cycle through full screen playback of the original video streams included on the guide video stream by the set-top box; and controlling by the set-top box an order that the user can cycle through full screen playback of the original video streams to match the particular order that they are arranged on the guide video stream.

17. The non-transitory processor-readable medium of claim 15, wherein the processor executable instructions further cause the one or more processors to perform steps of utilizing at least one RF tuner to receive at least one of the original video streams by the computer server, wherein the first communication interface includes at least one RF tuner coupled to a coax network.

18. The non-transitory processor-readable medium of claim 15, wherein the processor executable instructions further cause the one or more processors to perform steps of utilizing at least one IP network interface to receive at least one of the original video streams by the computer server, wherein the first communication interface includes at least one Internet protocol (IP) network interface coupled to an IP-based computer network.

19. The non-transitory processor-readable medium of claim 15, wherein the event occurrence is a new guest checking in to the particular guest room.

20. The non-transitory processor-readable medium of claim 15, wherein the user information comprises one or more specific channels and the one or more processors are further caused to select the plurality of original video streams to include the specific channels.

\* \* \* \* \*